(12) United States Patent
Smith et al.

(10) Patent No.: US 8,072,382 B2
(45) Date of Patent: Dec. 6, 2011

(54) METHOD AND APPARATUS FOR ADS-B VALIDATION, ACTIVE AND PASSIVE MULTILATERATION, AND ELLIPTICAL SURVEILLANCE

(75) Inventors: Alexander E. Smith, McLean, VA (US);
Russell Hulstrom, Williamstown (AU);
Carl A. Evers, Vienna, VA (US);
Thomas J. Breen, Tyngsborough, MA (US)

(73) Assignee: SRA International, Inc., Fairfax, VA (US)

( * ) Notice: Subject to any disclaimer, the term of this patent is extended or adjusted under 35 U.S.C. 154(b) by 26 days.

(21) Appl. No.: 12/471,384

(22) Filed: Jun. 6, 2009

(65) Prior Publication Data

US 2010/0149019 A1      Jun. 17, 2010

Related U.S. Application Data

(60) Division of application No. 11/541,480, filed on Sep. 29, 2006, now Pat. No. 7,570,214, which is a continuation-in-part of application No. 11/492,711, filed on Jul. 25, 2006, now Pat. No. 7,429,950, and a continuation-in-part of application No. 11/429,926, filed on May 8, 2006, now Pat. No. 7,477,193, and a continuation-in-part of application No. 11/343,079, filed on Jan. 30, 2006, now Pat. No. 7,375,683, and a continuation-in-part of application No. 11/342,289, filed on Jan. 28, 2006, now Pat. No. 7,576,695, and a continuation-in-part of application No. 11/209,030, filed on Aug. 22, 2005, now Pat. No. 7,248,219, and a continuation-in-part of application No. 11/257,416, filed on Oct. 24, 2005, now Pat. No. 7,495,612, and a continuation-in-part of application No. 11/203,823, filed on Aug. 15, 2005, now Pat. No. 7,739,167, and a continuation-in-part of application No. 11/145,170, filed on Jun. 6, 2005, now Pat. No. 7,437,250, and a continuation-in-part of application No. 10/743,042, filed on Dec. 23, 2003, now Pat. No. 7,132,982, which is a continuation-in-part of application No. 10/638,524, filed on Aug. 12, 2003, now Pat. No. 6,806,829, which is a continuation-in-part of application No. 10/319,725, filed on Dec. 16, 2002, now Pat. No. 6,812,890, which is a continuation of application No. 09/516,215, filed on Feb. 29, 2000, now Pat. No. 6,633,259.

(60) Provisional application No. 60/123,170, filed on Mar. 5, 1999, provisional application No. 60/440,618, filed on Jan. 17, 2003.

(51) Int. Cl.
*G01S 1/24* (2006.01)
*G01S 19/48* (2010.01)
*G01S 3/02* (2006.01)

(52) U.S. Cl. .......... 342/387; 342/357.31; 342/457; 342/463

(58) Field of Classification Search ............ 342/30, 342/357.31, 387, 442, 457, 463, 465
See application file for complete search history.

(56) References Cited

U.S. PATENT DOCUMENTS

| | | | |
|---|---|---|---|
| 1,738,571 A | 12/1929 | Gare | 404/18 |
| 3,668,403 A | 6/1972 | Meilander | 701/121 |
| 3,705,404 A | 12/1972 | Chisholm | 343/112 R |
| 3,792,472 A | 2/1974 | Payne et al. | 342/32 |
| 4,079,414 A | 3/1978 | Sullivan | 725/114 |
| 4,115,771 A | 9/1978 | Litchford | 343/6 R |
| 4,122,522 A | 10/1978 | Smith | 701/15 |
| 4,167,006 A | 9/1979 | Funatsu et al. | 343/6.5 LC |
| 4,196,474 A | 4/1980 | Buchanan et al. | 364/461 |
| 4,224,669 A | 9/1980 | Brame | 701/8 |
| 4,229,737 A | 10/1980 | Heldwein et al. | 343/6 R |
| 4,293,857 A | 10/1981 | Baldwin | 343/6.5 |
| 4,315,609 A | 2/1982 | McLean et al. | |
| 4,327,437 A | 4/1982 | Frosch et al. | 714/3 |
| 4,359,733 A | 11/1982 | O'Neill | 342/36 |
| 4,454,510 A | 6/1984 | Crow | 343/5 |
| 4,524,931 A | 6/1985 | Nilsson | 246/167 |
| 4,646,244 A | 2/1987 | Bateman | 701/301 |
| 4,688,046 A | 8/1987 | Schwab | 342/456 |

| Patent | Date | Inventor | Class |
|---|---|---|---|
| 4,782,450 A | 11/1988 | Flax | 364/461 |
| 4,811,308 A | 3/1989 | Michel | 367/136 |
| 4,843,397 A | 6/1989 | Galati et al. | 342/59 |
| 4,853,700 A | 8/1989 | Funatsu et al. | 342/30 |
| 4,897,661 A | 1/1990 | Hiraiwa | 342/457 |
| 4,899,296 A | 2/1990 | Khattak | 702/40 |
| 4,910,526 A | 3/1990 | Donnangelo et al. | 342/455 |
| 4,914,733 A | 4/1990 | Gralnick | 340/961 |
| 4,958,306 A | 9/1990 | Powell et al. | 702/40 |
| 5,001,490 A | 3/1991 | Fichtner | 342/195 |
| 5,001,650 A | 3/1991 | Francis et al. | 364/516 |
| 5,017,930 A | 5/1991 | Stoltz | 342/465 |
| 5,025,382 A | 6/1991 | Artz | 364/439 |
| 5,027,114 A | 6/1991 | Kawashima et al. | 340/941 |
| 5,045,861 A | 9/1991 | Duffett-Smith | 342/457 |
| 5,075,680 A | 12/1991 | Dabbs | 342/52 |
| 5,075,694 A | 12/1991 | Donnangelo et al. | 342/455 |
| 5,081,457 A | 1/1992 | Motisher et al. | 342/40 |
| 5,089,822 A | 2/1992 | Abaunza et al. | 342/30 |
| 5,113,193 A | 5/1992 | Powell et al. | 342/25 |
| 5,119,102 A | 6/1992 | Barnard | 342/357 |
| 5,132,695 A | 7/1992 | Sumas et al. | 342/461 |
| 5,138,321 A | 8/1992 | Hammer | 342/36 |
| 5,144,315 A | 9/1992 | Schwab et al. | 342/49 |
| 5,153,836 A | 10/1992 | Fraughton et al. | 364/461 |
| 5,179,384 A | 1/1993 | De Haan | 342/37 |
| 5,191,342 A | 3/1993 | Alsup et al. | 342/465 |
| 5,200,902 A | 4/1993 | Pilley | 364/439 |
| 5,225,842 A | 7/1993 | Brown et al. | 342/357 |
| 5,260,702 A | 11/1993 | Thompson | 340/970 |
| 5,262,784 A | 11/1993 | Drobnicki et al. | 342/45 |
| 5,265,023 A | 11/1993 | Sokkappa | 364/439 |
| 5,268,698 A | 12/1993 | Smith et al. | 342/450 |
| 5,283,574 A | 2/1994 | Grove | 340/970 |
| 5,311,194 A | 5/1994 | Brown | 342/357 |
| 5,317,316 A | 5/1994 | Sturm et al. | 342/30 |
| 5,317,317 A | 5/1994 | Billaud et al. | 342/40 |
| 5,339,281 A | 8/1994 | Narendra et al. | 367/5 |
| 5,341,139 A | 8/1994 | Billaud et al. | 342/40 |
| 5,365,516 A | 11/1994 | Jandrell | 370/18 |
| 5,374,932 A | 12/1994 | Wyschogrod et al. | 342/36 |
| 5,379,224 A | 1/1995 | Brown et al. | 364/449 |
| 5,381,140 A | 1/1995 | Kuroda et al. | 340/961 |
| 5,402,116 A | 3/1995 | Ashley | 340/870.1 |
| 5,406,288 A | 4/1995 | Billaud et al. | 342/37 |
| 5,424,746 A | 6/1995 | Schwab et al. | 342/49 |
| 5,424,748 A | 6/1995 | Pourailly et al. | 342/157 |
| 5,438,337 A | 8/1995 | Aguado | 342/29 |
| 5,448,233 A | 9/1995 | Saban et al. | 340/963 |
| 5,450,329 A | 9/1995 | Tanner | 364/449 |
| 5,454,720 A | 10/1995 | FitzGerald et al. | 434/27 |
| 5,455,586 A | 10/1995 | Barbier et al. | 342/37 |
| 5,471,657 A | 11/1995 | Gharpuray | 455/12.1 |
| 5,486,829 A | 1/1996 | Potier et al. | 342/40 |
| 5,493,309 A | 2/1996 | Bjornholt | 342/455 |
| 5,506,590 A | 4/1996 | Minter | 342/462 |
| 5,515,286 A | 5/1996 | Simon | 364/461 |
| 5,528,244 A | 6/1996 | Schwab | 342/37 |
| 5,534,871 A | 7/1996 | Hidaka et al. | 342/113 |
| 5,541,608 A | 7/1996 | Murphy et al. | 342/442 |
| 5,570,095 A | 10/1996 | Drouilhet, Jr. et al. | 342/357 |
| 5,570,099 A | 10/1996 | DesJardins | 342/37 |
| 5,583,775 A | 12/1996 | Nobe et al. | 364/449.7 |
| 5,590,044 A | 12/1996 | Buckreub | 364/453 |
| 5,596,326 A | 1/1997 | Fitts | 342/30 |
| 5,596,332 A | 1/1997 | Coles et al. | 342/455 |
| 5,608,412 A | 3/1997 | Welles, II et al. | 342/457 |
| 5,614,912 A | 3/1997 | Mitchell | 342/146 |
| 5,617,101 A | 4/1997 | Maine et al. | 342/358 |
| 5,627,546 A | 5/1997 | Crow | 342/352 |
| 5,629,691 A | 5/1997 | Jein | 340/961 |
| 5,635,693 A | 6/1997 | Benson et al. | 235/384 |
| 5,659,319 A | 8/1997 | Rost et al. | 342/36 |
| 5,666,110 A | 9/1997 | Paterson | 340/970 |
| 5,670,960 A | 9/1997 | Cessat | 342/25 |
| 5,670,961 A | 9/1997 | Tomita et al. | 342/36 |
| 5,677,841 A | 10/1997 | Shiomi et al. | 365/439 |
| 5,680,140 A | 10/1997 | Loomis | 342/357 |
| 5,686,921 A | 11/1997 | Okada et al. | 342/127 |
| 5,694,322 A | 12/1997 | Westerlage et al. | 364/464.27 |
| 5,714,948 A | 2/1998 | Farmakis et al. | 340/961 |
| 5,732,384 A | 3/1998 | Ellert et al. | 701/120 |
| 5,752,216 A | 5/1998 | Carlson et al. | 701/120 |
| 5,757,314 A | 5/1998 | Gounon et al. | 342/357 |
| 5,774,829 A | 6/1998 | Cisneros et al. | 701/213 |
| 5,781,150 A | 7/1998 | Norris | 342/357 |
| 5,784,022 A | 7/1998 | Kupfer | 342/80 |
| 5,793,329 A | 8/1998 | Nakada et al. | 342/357 |
| 5,798,712 A | 8/1998 | Coquin | 340/970 |
| 5,802,542 A | 9/1998 | Coiera et al. | 711/4 |
| 5,825,021 A | 10/1998 | Uemura | 250/222.1 |
| 5,828,333 A | 10/1998 | Richardson et al. | 342/70 |
| 5,839,080 A | 11/1998 | Muller | 701/9 |
| 5,841,391 A | 11/1998 | Lucas, Jr. et al. | 342/34 |
| 5,841,398 A | 11/1998 | Brock | 342/357 |
| 5,850,420 A | 12/1998 | Guillard et al. | 375/316 |
| 5,867,804 A | 2/1999 | Pilley et al. | 701/120 |
| 5,872,526 A | 2/1999 | Tognazzini | 340/961 |
| 5,884,222 A | 3/1999 | Denoize et al. | 701/301 |
| 5,890,068 A | 3/1999 | Fattouche et al. | 455/456.2 |
| 5,892,462 A | 4/1999 | Tran | 340/961 |
| 5,913,912 A | 6/1999 | Nishimura et al. | 701/35 |
| 5,920,277 A | 7/1999 | Foster et al. | 342/32 |
| 5,920,318 A | 7/1999 | Salvatore, Jr. et al. | 345/418 |
| 5,923,293 A | 7/1999 | Smith et al. | 342/455 |
| 5,949,375 A | 9/1999 | Ishiguro et al. | 342/457 |
| 5,969,674 A | 10/1999 | von der Embse et al. | 342/357.16 |
| 5,977,905 A | 11/1999 | Le Chevalier | 342/357 |
| 5,979,234 A | 11/1999 | Karlsen | 73/170.13 |
| 5,990,833 A | 11/1999 | Ahlbom et al. | 342/417 |
| 5,991,687 A | 11/1999 | Hale et al. | 701/207 |
| 5,995,040 A | 11/1999 | Issler et al. | 342/352 |
| 5,999,116 A | 12/1999 | Evers | 342/36 |
| 6,043,777 A | 3/2000 | Bergman et al. | 342/357 |
| 6,044,322 A | 3/2000 | Stieler | 701/120 |
| 6,049,304 A | 4/2000 | Rudel et al. | 342/357.08 |
| 6,049,754 A | 4/2000 | Beaton et al. | 701/204 |
| 6,075,479 A | 6/2000 | Kudoh | 342/70 |
| 6,081,222 A | 6/2000 | Henkel et al. | 342/45 |
| 6,081,764 A | 6/2000 | Varon | 701/120 |
| 6,085,150 A | 7/2000 | Henry et al. | 701/301 |
| 6,088,634 A | 7/2000 | Muller | 701/9 |
| 6,092,009 A | 7/2000 | Glover | 701/14 |
| 6,094,169 A | 7/2000 | Smith et al. | 342/465 |
| 6,122,570 A | 9/2000 | Muller | 701/9 |
| 6,127,944 A | 10/2000 | Daly | 340/963 |
| 6,133,867 A | 10/2000 | Eberwine et al. | 342/29 |
| 6,138,060 A | 10/2000 | Conner | 701/9 |
| 6,147,748 A | 11/2000 | Hughes | 356/4.09 |
| 6,161,097 A | 12/2000 | Glass et al. | 705/6 |
| 6,178,363 B1 | 1/2001 | McIntyre et al. | 701/16 |
| 6,188,937 B1 | 2/2001 | Sherry et al. | 701/14 |
| 6,195,040 B1 | 2/2001 | Arethens | 342/357.12 |
| 6,195,609 B1 | 2/2001 | Pilley | 701/120 |
| 6,201,499 B1 | 3/2001 | Hawkes et al. | 342/387 |
| 6,208,284 B1 | 3/2001 | Woodell et al. | 342/30 |
| 6,208,937 B1 | 3/2001 | Huddle | 701/221 |
| 6,211,811 B1 | 4/2001 | Evers | 342/36 |
| 6,219,592 B1 | 4/2001 | Muller et al. | 701/9 |
| 6,222,480 B1 | 4/2001 | Kuntman et al. | 342/30 |
| 6,225,942 B1 | 5/2001 | Alon | 342/59 |
| 6,230,018 B1 | 5/2001 | Watters et al. | 455/456 |
| 6,233,522 B1 | 5/2001 | Morici | 701/208 |
| 6,239,739 B1 | 5/2001 | Thomson et al. | 342/96 |
| 6,240,345 B1 | 5/2001 | Vesel | 701/31 |
| 6,246,342 B1 | 6/2001 | Vandevoorde et al. | 340/961 |
| 6,253,147 B1 | 6/2001 | Greenstein | 701/202 |
| 6,271,768 B1 | 8/2001 | Frazier, Jr. et al. | 340/961 |
| 6,275,172 B1 | 8/2001 | Curtis et al. | 340/961 |
| 6,275,767 B1 | 8/2001 | Delseny et al. | 701/120 |
| 6,282,487 B1 | 8/2001 | Shiomi et al. | 701/120 |
| 6,282,488 B1 | 8/2001 | Castor et al. | 701/120 |
| 6,289,280 B1 | 9/2001 | Fernandez-Corbaton | 701/214 |
| 6,292,721 B1 | 9/2001 | Conner et al. | 701/9 |
| 6,311,127 B1 | 10/2001 | Stratton et al. | 701/213 |
| 6,314,361 B1 | 11/2001 | Yu et al. | 701/120 |
| 6,314,363 B1 | 11/2001 | Pilley et al. | 701/120 |

| Patent | Kind | Date | Inventor | Class |
|---|---|---|---|---|
| 6,317,663 | B1 | 11/2001 | Meunier et al. | 701/16 |
| 6,321,091 | B1 | 11/2001 | Holland | 455/456 |
| 6,327,471 | B1 | 12/2001 | Song | 455/440 |
| 6,329,947 | B2 | 12/2001 | Smith | 342/418 |
| 6,337,652 | B1 | 1/2002 | Shiomi et al. | 342/37 |
| 6,338,011 | B1 | 1/2002 | Furst et al. | 701/1 |
| 6,339,745 | B1 | 1/2002 | Novik | 701/208 |
| 6,340,935 | B1 | 1/2002 | Hall | 340/932.2 |
| 6,340,947 | B1 | 1/2002 | Chang et al. | 342/357.01 |
| 6,344,820 | B1 | 2/2002 | Shiomi et al. | 342/174 |
| 6,347,263 | B1 | 2/2002 | Johnson et al. | 701/14 |
| 6,348,856 | B1 | 2/2002 | Jones et al. | 340/10.1 |
| 6,366,240 | B1 | 4/2002 | Timothy et al. | 342/417 |
| 6,377,208 | B2 | 4/2002 | Chang et al. | 342/357.01 |
| 6,380,869 | B1 | 4/2002 | Simon et al. | 340/945 |
| 6,380,870 | B1 | 4/2002 | Conner et al. | 340/970 |
| 6,384,783 | B1 | 5/2002 | Smith et al. | 342/387 |
| 6,393,359 | B1 | 5/2002 | Flynn et al. | 701/120 |
| 6,396,435 | B1 | 5/2002 | Fleischhauer et al. | 342/70 |
| 6,408,233 | B1 | 6/2002 | Solomon et al. | 701/35 |
| 6,414,629 | B1 | 7/2002 | Curcio | 342/357.08 |
| 6,415,219 | B1 | 7/2002 | Degodyuk | 70/117 |
| 6,420,993 | B1 | 7/2002 | Varon | 342/36 |
| 6,445,310 | B1 | 9/2002 | Bateman et al. | 340/970 |
| 6,445,927 | B1 | 9/2002 | Kng et al. | 455/456 |
| 6,448,929 | B1 | 9/2002 | Smith et al. | 342/456 |
| 6,459,411 | B2 | 10/2002 | Frazier et al. | 342/455 |
| 6,462,674 | B2 | 10/2002 | Ohmura et al. | 340/901 |
| 6,463,383 | B1 | 10/2002 | Baiada et al. | 701/120 |
| 6,469,654 | B1 | 10/2002 | Winner et al. | 342/33 |
| 6,469,655 | B1 | 10/2002 | Franke et al. | 342/36 |
| 6,469,664 | B1 | 10/2002 | Michaelson et al. | 342/357.13 |
| 6,473,027 | B1 | 10/2002 | Alon | 342/37 |
| 6,473,694 | B1 | 10/2002 | Akopian et al. | 701/213 |
| 6,477,449 | B1 | 11/2002 | Conner et al. | 701/4 |
| 6,492,932 | B1 | 12/2002 | Jin et al. | 342/25 |
| 6,493,610 | B1 | 12/2002 | Ezaki | 701/3 |
| 6,504,490 | B2 | 1/2003 | Mizushima | 340/943 |
| 6,518,916 | B1 | 2/2003 | Ashihara et al. | 342/70 |
| 6,522,295 | B2 | 2/2003 | Baugh et al. | 342/453 |
| 6,531,978 | B2 | 3/2003 | Tran | 342/29 |
| 6,542,809 | B2 | 4/2003 | Hehls, III | 701/120 |
| 6,542,810 | B2 | 4/2003 | Lai | 701/120 |
| 6,545,631 | B2 | 4/2003 | Hudson et al. | 342/30 |
| 6,549,829 | B1 | 4/2003 | Anderson et al. | 701/16 |
| 6,563,432 | B1 | 5/2003 | Millgard | 340/961 |
| 6,567,043 | B2 | 5/2003 | Smith et al. | 342/450 |
| 6,571,155 | B2 | 5/2003 | Carriker et al. | 701/3 |
| 6,584,400 | B2 | 6/2003 | Beardsworth | 701/120 |
| 6,584,414 | B1 | 6/2003 | Green et al. | 702/33 |
| 6,587,079 | B1 | 7/2003 | Rickard et al. | 342/387 |
| 6,606,034 | B1 | 8/2003 | Muller et al. | 340/970 |
| 6,606,563 | B2 | 8/2003 | Corcoran, III | 701/301 |
| 6,615,648 | B1 | 9/2003 | Ferguson et al. | 73/146 |
| 6,617,997 | B2 | 9/2003 | Ybarra et al. | 342/29 |
| 6,618,008 | B1 | 9/2003 | Scholz | 342/427 |
| 6,633,259 | B1 | 10/2003 | Smith et al. | 342/456 |
| 6,657,578 | B2 | 12/2003 | Stayton | 342/30 |
| 6,680,687 | B2 | 1/2004 | Phelipot | 342/29 |
| 6,690,295 | B1 | 2/2004 | De Boer | 340/951 |
| 6,690,296 | B2 | 2/2004 | Corwin et al. | 340/961 |
| 6,690,618 | B2 | 2/2004 | Tomasi et al. | 367/127 |
| 6,691,004 | B2 | 2/2004 | Johnson | 701/14 |
| 6,707,394 | B2 | 3/2004 | Ishihara et al. | 340/970 |
| 6,710,719 | B1 | 3/2004 | Jones et al. | 340/825.49 |
| 6,710,723 | B2 | 3/2004 | Muller | 340/970 |
| 6,714,782 | B1 | 3/2004 | Monot et al. | 455/431 |
| 6,721,652 | B1 | 4/2004 | Sanqunetti | 701/207 |
| 6,744,396 | B2 | 6/2004 | Stone et al. | 342/36 |
| 6,750,815 | B2 | 6/2004 | Michaelson et al. | 342/357.13 |
| 6,751,545 | B2 | 6/2004 | Walter | 701/120 |
| 6,760,387 | B2 | 7/2004 | Langford et al. | 375/267 |
| 6,765,533 | B2 | 7/2004 | Szajnowski | 342/465 |
| 6,789,011 | B2 | 9/2004 | Baiada et al. | 701/120 |
| 6,789,016 | B2 | 9/2004 | Bayh et al. | 701/301 |
| 6,792,058 | B1 | 9/2004 | Hershey et al. | 375/347 |
| 6,792,340 | B2 | 9/2004 | Dunsky et al. | 701/3 |
| 6,798,381 | B2 | 9/2004 | Benner et al. | 342/450 |
| 6,799,114 | B2 | 9/2004 | Etnyre | 701/120 |
| 6,801,152 | B1 | 10/2004 | Rose | 342/13 |
| 6,801,155 | B2 | 10/2004 | Jahangir et al. | 342/90 |
| 6,809,679 | B2 | 10/2004 | LaFrey et al. | 342/37 |
| 6,810,329 | B2 | 10/2004 | Koga | 701/211 |
| 6,812,890 | B2 | 11/2004 | Smith et al. | 342/454 |
| 6,816,105 | B2 | 11/2004 | Winner et al. | 342/37 |
| 6,819,282 | B1 | 11/2004 | Galati et al. | 342/37 |
| 6,823,188 | B1 | 11/2004 | Stern | 455/456.1 |
| 6,828,921 | B2 | 12/2004 | Brown et al. | 340/945 |
| 6,845,362 | B2 | 1/2005 | Furuta et al. | 705/13 |
| 6,861,982 | B2 | 3/2005 | Forstrom et al. | 342/387 |
| 6,862,519 | B2 | 3/2005 | Walter | 701/120 |
| 6,862,541 | B2 | 3/2005 | Mizushima | 702/26 |
| 6,865,484 | B2 | 3/2005 | Miyasaka et al. | 701/213 |
| 6,873,269 | B2 | 3/2005 | Tran | 340/961 |
| 6,873,903 | B2 | 3/2005 | Baiada et al. | 701/120 |
| 6,876,859 | B2 | 4/2005 | Anderson et al. | 455/456.1 |
| 6,882,930 | B2 | 4/2005 | Trayford et al. | 701/117 |
| 6,885,340 | B2 | 4/2005 | Smith et al. | 342/465 |
| 6,900,760 | B2 | 5/2005 | Groves | 342/357.14 |
| 6,912,461 | B2 | 6/2005 | Poreda | 701/120 |
| 6,927,701 | B2 | 8/2005 | Schmidt et al. | 340/959 |
| 6,930,638 | B2 | 8/2005 | Lloyd et al. | 342/453 |
| 6,952,631 | B2 | 10/2005 | Griffith et al. | 701/13 |
| 6,963,304 | B2 | 11/2005 | Murphy | 342/357.02 |
| 6,967,616 | B2 | 11/2005 | Etnyre | 342/182 |
| 6,977,612 | B1 | 12/2005 | Bennett | 342/357.07 |
| 6,985,103 | B2 | 1/2006 | Ridderheim et al. | 342/30 |
| 6,985,743 | B2 | 1/2006 | Bajikar | 455/456.1 |
| 6,992,626 | B2 | 1/2006 | Smith | 342/454 |
| 7,006,032 | B2 | 2/2006 | King et al. | 342/29 |
| 7,012,552 | B2 | 3/2006 | Baugh et al. | 340/945 |
| 7,026,987 | B2 | 4/2006 | Lokshin et al. | 342/357.12 |
| 7,030,780 | B2 | 4/2006 | Shiomi et al. | 340/961 |
| 7,043,355 | B2 | 5/2006 | Lai | 701/120 |
| 7,050,909 | B2 | 5/2006 | Nichols et al. | 701/301 |
| 7,053,792 | B2 | 5/2006 | Aoki et al. | 340/928 |
| 7,058,506 | B2 | 6/2006 | Kawase et al. | 701/201 |
| 7,062,381 | B1 | 6/2006 | Rekow et al. | 701/300 |
| 7,065,443 | B2 | 6/2006 | Flynn et al. | 701/120 |
| 7,071,843 | B2 | 7/2006 | Hashida et al. | 340/995.12 |
| 7,071,867 | B2 | 7/2006 | Wittenberg et al. | 342/70 |
| 7,079,925 | B2 | 7/2006 | Kubota et al. | 701/1 |
| 7,095,360 | B2 | 8/2006 | Kuji et al. | 342/29 |
| 7,102,570 | B2 | 9/2006 | Bar-On et al. | 342/465 |
| 7,106,212 | B2 | 9/2006 | Konishi et al. | 340/905 |
| 7,109,889 | B2 | 9/2006 | He | 340/971 |
| 7,117,089 | B2 | 10/2006 | Khatwa et al. | 701/301 |
| 7,120,537 | B2 | 10/2006 | Flynn et al. | 701/120 |
| 7,123,169 | B2 | 10/2006 | Farmer et al. | 340/945 |
| 7,123,192 | B2 | 10/2006 | Smith et al. | 342/455 |
| 7,126,534 | B2 | 10/2006 | Smith et al. | 342/456 |
| 7,136,059 | B2 | 11/2006 | Kraus et al. | 345/419 |
| 7,142,154 | B2 | 11/2006 | Quilter et al. | 342/357.06 |
| 7,148,816 | B1 | 12/2006 | Carrico | 340/961 |
| 7,155,240 | B2 | 12/2006 | Atkinson et al. | 455/456.2 |
| 7,164,986 | B2 | 1/2007 | Humphries et al. | 701/207 |
| 7,170,441 | B2 | 1/2007 | Perl et al. | 342/29 |
| 7,170,820 | B2 | 1/2007 | Szajnowski | 367/127 |
| 7,187,327 | B2 | 3/2007 | Coluzzi et al. | 342/458 |
| 7,190,303 | B2 | 3/2007 | Rowlan | 342/29 |
| 7,196,621 | B2 | 3/2007 | Kochis | 340/539.13 |
| 7,206,698 | B2 | 4/2007 | Conner et al. | 701/301 |
| 7,218,276 | B2 | 5/2007 | Teranishi | 342/357.1 |
| 7,218,278 | B1 | 5/2007 | Arethens | 342/367.03 |
| 7,221,308 | B2 | 5/2007 | Burton et al. | 342/42 |
| 7,228,207 | B2 | 6/2007 | Clarke et al. | 701/3 |
| 7,233,545 | B2 | 6/2007 | Harvey, Jr. et al. | 367/127 |
| 7,248,963 | B2 | 7/2007 | Baiada et al. | 701/120 |
| 7,250,849 | B2 | 7/2007 | Spriggs et al. | 340/435 |
| 7,250,901 | B2 | 7/2007 | Stephens | 342/146 |
| 7,257,469 | B1 | 8/2007 | Pemble | 701/3 |
| 7,272,495 | B2 | 9/2007 | Coluzzi et al. | 701/207 |
| 7,277,052 | B2 | 10/2007 | Delaveau et al. | 342/387 |
| 7,286,624 | B2 | 10/2007 | Woo et al. | 375/356 |
| 7,307,578 | B2 | 12/2007 | Blaskovich et al. | 342/29 |
| 7,308,343 | B1 | 12/2007 | Horvath et al. | 701/3 |
| 7,321,813 | B2 | 1/2008 | Meunier | 701/10 |
| 7,333,052 | B2 | 2/2008 | Maskell | 342/195 |

| Patent Number | Date | Inventor | Class |
|---|---|---|---|
| 7,333,887 B2 | 2/2008 | Baiada et al. | 701/120 |
| 7,352,318 B2 | 4/2008 | Osman et al. | 342/37 |
| 7,358,854 B2 | 4/2008 | Egner et al. | 340/539.13 |
| 7,379,165 B2 | 5/2008 | Anderson et al. | 356/5.05 |
| 7,382,286 B2 | 6/2008 | Cole et al. | 340/961 |
| 7,383,104 B2 | 6/2008 | Ishii et al. | 701/3 |
| 7,383,124 B1 | 6/2008 | Vesel | 701/200 |
| 7,385,527 B1 | 6/2008 | Clavier et al. | 340/945 |
| 7,391,359 B2 | 6/2008 | Ootomo et al. | 342/37 |
| 7,398,157 B2 | 7/2008 | Sigurdsson et al. | 701/213 |
| 7,400,297 B2 | 7/2008 | Ferreol et al. | 342/377 |
| 7,408,497 B2 | 8/2008 | Billaud et al. | 342/30 |
| 7,408,498 B2 | 8/2008 | Kuji et al. | 342/37 |
| 7,420,501 B2 | 9/2008 | Perl | 342/30 |
| 7,430,218 B2 | 9/2008 | Lee et al. | 370/464 |
| 7,437,225 B1 | 10/2008 | Rathinam | 701/14 |
| 7,440,846 B2 | 10/2008 | Irie et al. | 701/200 |
| 7,457,690 B2 | 11/2008 | Wilson, Jr. | 701/3 |
| 7,460,866 B2 | 12/2008 | Salkini et al. | 455/431 |
| 7,460,871 B2 | 12/2008 | Humphries et al. | 455/456.1 |
| 7,477,145 B2 | 1/2009 | Tatton et al. | 340/531 |
| 7,479,919 B2 | 1/2009 | Poe et al. | 342/30 |
| 7,479,922 B2 | 1/2009 | Hunt et al. | 342/357.02 |
| 7,479,923 B2 | 1/2009 | Carpenter | 342/357.02 |
| 7,479,925 B2 | 1/2009 | Schell | 342/455 |
| 7,487,108 B2 | 2/2009 | Aoki et al. | 705/13 |
| 7,501,977 B2 | 3/2009 | Ino | 342/37 |
| 7,504,996 B2 | 3/2009 | Martin | 342/357.12 |
| 7,515,715 B2 | 4/2009 | Olive | 380/255 |
| 2001/0014847 A1 | 8/2001 | Keenan | 701/117 |
| 2001/0026240 A1 | 10/2001 | Neher | 342/357.07 |
| 2002/0089433 A1 | 7/2002 | Bateman et al. | 340/970 |
| 2002/0152029 A1 | 10/2002 | Sainthuile et al. | 701/301 |
| 2003/0060941 A1 | 3/2003 | Griffith et al. | 701/3 |
| 2003/0097216 A1 | 5/2003 | Etnyre | 701/120 |
| 2003/0152248 A1 | 8/2003 | Spark et al. | 382/103 |
| 2003/0158799 A1 | 8/2003 | Kakihara et al. | 705/30 |
| 2004/0002886 A1 | 1/2004 | Dickerson et al. | |
| 2004/0004554 A1 | 1/2004 | Srinivasan et al. | 340/870.01 |
| 2004/0039806 A1 | 2/2004 | Miras | 709/223 |
| 2004/0044463 A1 | 3/2004 | Shen-Feng et al. | 701/120 |
| 2004/0086121 A1 | 5/2004 | Viggiano et al. | 380/255 |
| 2004/0094622 A1 | 5/2004 | Vismara | 235/384 |
| 2004/0210371 A1 | 10/2004 | Adachi et al. | 701/50 |
| 2004/0225432 A1 | 11/2004 | Pilley et al. | 701/117 |
| 2004/0266341 A1 | 12/2004 | Teunon | 455/12.1 |
| 2005/0007272 A1 | 1/2005 | Smith et al. | 342/189 |
| 2005/0021283 A1 | 1/2005 | Brinton et al. | 702/150 |
| 2005/0057395 A1 | 3/2005 | Atkinson | |
| 2005/0159170 A1 | 7/2005 | Humphries et al. | 455/456.1 |
| 2005/0166672 A1 | 8/2005 | Atkinson | 73/290 |
| 2005/0192717 A1 | 9/2005 | Tafs et al. | 701/3 |
| 2005/0228715 A1 | 10/2005 | Hartig et al. | 705/13 |
| 2005/0231422 A1 | 10/2005 | Etnyre | 342/182 |
| 2006/0023655 A1 | 2/2006 | Engel et al. | 370/328 |
| 2006/0044184 A1 | 3/2006 | Kimura | 342/357.09 |
| 2006/0052933 A1 | 3/2006 | Ota | 701/200 |
| 2006/0119515 A1 | 6/2006 | Smith | 342/450 |
| 2006/0129310 A1 | 6/2006 | Tarrant et al. | 701/201 |
| 2006/0161340 A1 | 7/2006 | Lee | 701/207 |
| 2006/0167598 A1 | 7/2006 | Pennarola | 701/11 |
| 2006/0181447 A1 | 8/2006 | Kuji et al. | 342/32 |
| 2006/0191326 A1 | 8/2006 | Smith et al. | 73/73 |
| 2006/0208924 A1 | 9/2006 | Matalon | 340/933 |
| 2006/0262014 A1 | 11/2006 | Shemesh et al. | 342/386 |
| 2006/0265664 A1 | 11/2006 | Simons et al. | 715/722 |
| 2006/0276201 A1 | 12/2006 | Dupray | 455/456.1 |
| 2007/0001903 A1 | 1/2007 | Smith et al. | 342/387 |
| 2007/0040734 A1 | 2/2007 | Evers | 342/126 |
| 2007/0060079 A1 | 3/2007 | Nakagawa et al. | 455/131 |
| 2007/0090295 A1 | 4/2007 | Parkinson et al. | 250/349 |
| 2007/0106436 A1 | 5/2007 | Johansson | 701/23 |
| 2007/0109184 A1 | 5/2007 | Shyr et al. | 342/357.06 |
| 2007/0159356 A1 | 7/2007 | Borel et al. | 340/945 |
| 2007/0159378 A1 | 7/2007 | Powers et al. | 342/29 |
| 2007/0182589 A1 | 8/2007 | Tran | 340/961 |
| 2007/0213887 A1 | 9/2007 | Woodings | 701/1 |
| 2007/0222665 A1 | 9/2007 | Koeneman | 342/29 |
| 2007/0250259 A1 | 10/2007 | Dare | 701/201 |
| 2007/0252750 A1 | 11/2007 | Jean et al. | 342/40 |
| 2007/0298786 A1 | 12/2007 | Meyers et al. | 455/431 |
| 2008/0027596 A1 | 1/2008 | Conner et al. | 701/16 |
| 2008/0042880 A1 | 2/2008 | Ramaiah et al. | 340/958 |
| 2008/0042902 A1 | 2/2008 | Brandwood et al. | 342/465 |
| 2008/0062011 A1 | 3/2008 | Butler et al. | 340/961 |
| 2008/0063123 A1 | 3/2008 | De Mey et al. | 375/350 |
| 2008/0068250 A1 | 3/2008 | Brandao et al. | 342/30 |
| 2008/0088508 A1 | 4/2008 | Smith | 342/453 |
| 2008/0106438 A1 | 5/2008 | Clark et al. | 340/972 |
| 2008/0106457 A1 | 5/2008 | Bartolini et al. | 342/40 |
| 2008/0109343 A1 | 5/2008 | Robinson et al. | 705/37 |
| 2008/0117106 A1 | 5/2008 | Sarno et al. | 342/444 |
| 2008/0120032 A1 | 5/2008 | Brandao et al. | 701/300 |
| 2008/0129601 A1 | 6/2008 | Thomas | 342/465 |
| 2008/0132270 A1 | 6/2008 | Basir | 455/550.1 |
| 2008/0137524 A1 | 6/2008 | Anderson et al. | 370/203 |
| 2008/0150784 A1 | 6/2008 | Zhang et al. | 342/30 |
| 2008/0158040 A1 | 7/2008 | Stayton et al. | 342/32 |
| 2008/0158059 A1 | 7/2008 | Bull et al. | 342/387 |
| 2008/0174472 A1 | 7/2008 | Stone et al. | 342/30 |
| 2008/0183344 A1 | 7/2008 | Doyen et al. | 701/9 |
| 2008/0186224 A1 | 8/2008 | Ichiyanagi et al. | 342/109 |
| 2008/0186231 A1 | 8/2008 | Aljadeff et al. | 342/387 |
| 2008/0195309 A1 | 8/2008 | Prinzel, III et al. | 701/208 |
| 2008/0231494 A1 | 9/2008 | Galati | 342/37 |
| 2008/0252528 A1 | 10/2008 | Shen et al. | 342/451 |
| 2008/0266166 A1 | 10/2008 | Schuchman | 342/97 |
| 2008/0272227 A1 | 11/2008 | Sharpe | 244/3.16 |
| 2008/0275642 A1 | 11/2008 | Clark et al. | 701/208 |
| 2008/0294306 A1 | 11/2008 | Huynh et al. | 701/3 |
| 2008/0297398 A1 | 12/2008 | Kamimura | 342/38 |
| 2009/0005960 A1 | 1/2009 | Roberts et al. | 701/120 |
| 2009/0009357 A1 | 1/2009 | Heen et al. | 340/825.09 |
| 2009/0012660 A1 | 1/2009 | Roberts et al. | 701/3 |
| 2009/0012661 A1 | 1/2009 | Louis | 701/9 |
| 2009/0015471 A1 | 1/2009 | Shen et al. | 342/357.15 |
| 2009/0027270 A1 | 1/2009 | Fisher et al. | 342/387 |
| 2009/0051570 A1 | 2/2009 | Clark et al. | 340/971 |
| 2009/0055038 A1 | 2/2009 | Garrec et al. | 701/17 |

FOREIGN PATENT DOCUMENTS

| | | |
|---|---|---|
| DE | 4306660 A1 | 8/1974 |
| DE | 4204164 A1 | 8/1993 |
| DE | 19751092 A1 | 6/1999 |
| DE | 10149006 A1 | 4/2003 |
| DE | 202004007747 U1 | 9/2004 |
| DE | 202006005089 U1 | 6/2006 |
| DE | 102006009121 A1 | 8/2007 |
| EP | 0265902 A2 | 5/1988 |
| EP | 0346461 A1 | 12/1989 |
| EP | 0514826 A1 | 11/1992 |
| EP | 0550073 A2 | 7/1993 |
| EP | 0574009 A3 | 6/1994 |
| EP | 0613110 A1 | 8/1994 |
| EP | 0613111 A1 | 8/1994 |
| EP | 0614092 A1 | 9/1994 |
| EP | 0629877 A1 | 12/1994 |
| EP | 0355336 B1 | 8/1995 |
| EP | 0670566 A2 | 9/1995 |
| EP | 0682332 A1 | 11/1995 |
| EP | 0505827 B1 | 6/1996 |
| EP | 0385600 B1 | 7/1996 |
| EP | 0732596 A2 | 9/1996 |
| EP | 0487940 B1 | 1/1997 |
| EP | 0774148 A1 | 5/1997 |
| EP | 0578316 B1 | 4/1998 |
| EP | 0915349 A1 | 5/1999 |
| EP | 1022580 A3 | 2/2001 |
| EP | 1118871 A2 | 7/2001 |
| EP | 0877997 B1 | 12/2001 |
| EP | 0778470 B1 | 5/2002 |
| EP | 1202233 A1 | 5/2002 |
| EP | 0865004 B1 | 7/2002 |
| EP | 1109032 B1 | 3/2003 |
| EP | 1300689 A2 | 4/2003 |
| EP | 1331620 A1 | 7/2003 |
| EP | 1345044 A1 | 9/2003 |
| EP | 1369704 A1 | 12/2003 |

| | | | | | | |
|---|---|---|---|---|---|---|
| EP | 1302920 | B1 | 2/2004 | WO | WO9935630 A1 | 7/1999 |
| EP | 1396832 | A1 | 3/2004 | WO | WO9942855 A1 | 8/1999 |
| EP | 1406228 | A2 | 4/2004 | WO | WO9945519 A2 | 9/1999 |
| EP | 1070968 | B1 | 5/2004 | WO | WO9950985 | 10/1999 |
| EP | 1431946 | A1 | 6/2004 | WO | WO9956144 A1 | 11/1999 |
| EP | 1467575 | A1 | 10/2004 | WO | WO0023816 A1 | 4/2000 |
| EP | 0903589 | B1 | 11/2004 | WO | WO0039775 A2 | 7/2000 |
| EP | 1517281 | A2 | 3/2005 | WO | WO0111389 A1 | 2/2001 |
| EP | 1531340 | A1 | 5/2005 | WO | WO0133302 A2 | 5/2001 |
| EP | 0926510 | B1 | 8/2005 | WO | WO0148652 A1 | 7/2001 |
| EP | 1405286 | B1 | 9/2005 | WO | WO0157550 A1 | 8/2001 |
| EP | 1485730 | B1 | 9/2005 | WO | WO0159601 A1 | 8/2001 |
| EP | 1428195 | B1 | 10/2005 | WO | WO0163239 A1 | 8/2001 |
| EP | 1603098 | A1 | 12/2005 | WO | WO0165276 A1 | 9/2001 |
| EP | 1125415 | B1 | 1/2006 | WO | WO0186319 | 11/2001 |
| EP | 1205732 | B1 | 3/2006 | WO | WO0194969 A2 | 12/2001 |
| EP | 1632787 | A1 | 3/2006 | WO | WO0205245 A2 | 1/2002 |
| EP | 1632892 | A2 | 3/2006 | WO | WO0208784 A1 | 1/2002 |
| EP | 0953261 | B1 | 6/2006 | WO | WO0215151 A1 | 2/2002 |
| EP | 1275975 | B1 | 6/2006 | WO | WO0227275 A2 | 4/2002 |
| EP | 1285232 | B1 | 6/2006 | WO | WO02054103 A2 | 7/2002 |
| EP | 1672384 | A2 | 6/2006 | WO | WO02059838 A2 | 8/2002 |
| EP | 0987562 | B1 | 7/2006 | WO | WO02066288 A1 | 8/2002 |
| EP | 1093564 | B1 | 11/2006 | WO | WO02069300 A1 | 9/2002 |
| EP | 1218694 | B1 | 11/2006 | WO | WO02075667 A1 | 9/2002 |
| EP | 1727094 | A2 | 11/2006 | WO | WO02091312 A2 | 11/2002 |
| EP | 1742170 | A1 | 1/2007 | WO | WO02095709 A2 | 11/2002 |
| EP | 1188137 | B1 | 2/2007 | WO | WO02099769 | 12/2002 |
| EP | 1755356 | A1 | 2/2007 | WO | WO03013010 A1 | 2/2003 |
| EP | 1463002 | B1 | 4/2007 | WO | WO03016937 A1 | 2/2003 |
| EP | 1361555 | B1 | 5/2007 | WO | WO03023439 A2 | 3/2003 |
| EP | 1798572 | A1 | 6/2007 | WO | WO03027934 A1 | 4/2003 |
| EP | 1410364 | B1 | 10/2007 | WO | WO03054830 A2 | 7/2003 |
| EP | 1843161 | A2 | 10/2007 | WO | WO03056495 A1 | 7/2003 |
| EP | 1860456 | A1 | 11/2007 | WO | WO03060855 A1 | 7/2003 |
| EP | 1884462 | A1 | 2/2008 | WO | WO03067281 A1 | 8/2003 |
| EP | 1101385 | B1 | 3/2008 | WO | WO03079136 A2 | 9/2003 |
| EP | 1901090 | A1 | 3/2008 | WO | WO03081560 A1 | 10/2003 |
| EP | 0964268 | B1 | 4/2008 | WO | WO03093775 A1 | 11/2003 |
| EP | 1483755 | B1 | 4/2008 | WO | WO03096282 A1 | 11/2003 |
| EP | 1906204 | A2 | 4/2008 | WO | WO03098576 A1 | 11/2003 |
| EP | 1912077 | A2 | 4/2008 | WO | WO03107299 A2 | 12/2003 |
| EP | 1331490 | B1 | 6/2008 | WO | WO2004042418 A1 | 5/2004 |
| EP | 1942351 | A1 | 7/2008 | WO | WO2004068162 A2 | 8/2004 |
| EP | 1327159 | B1 | 8/2008 | WO | WO2004109317 A2 | 12/2004 |
| EP | 1436641 | B1 | 8/2008 | WO | WO2004114252 A1 | 12/2004 |
| EP | 1953565 | A1 | 8/2008 | WO | WO2005038478 A2 | 4/2005 |
| EP | 1483902 | B1 | 9/2008 | WO | WO2005052887 A2 | 6/2005 |
| EP | 1965219 | A1 | 9/2008 | WO | WO2005081012 A1 | 9/2005 |
| EP | 1972962 | A2 | 9/2008 | WO | WO2005081630 A2 | 9/2005 |
| EP | 1975884 | A1 | 10/2008 | WO | WO2005114613 A1 | 12/2005 |
| EP | 1118011 | B1 | 11/2008 | WO | WO2005121701 A2 | 12/2005 |
| EP | 1995708 | A1 | 11/2008 | WO | WO2005017555 A2 | 5/2006 |
| EP | 2000778 | A2 | 12/2008 | WO | WO2006070207 A1 | 7/2006 |
| EP | 2001004 | A2 | 12/2008 | WO | WO2006079165 A1 | 8/2006 |
| EP | 2023155 | A1 | 2/2009 | WO | WO2006093682 A2 | 9/2006 |
| FR | 2708349 | A1 | 2/1995 | WO | WO2006108275 A1 | 10/2006 |
| FR | 2791778 | A1 | 10/2000 | WO | WO2006110973 A1 | 10/2006 |
| FR | 2881841 | A1 | 8/2006 | WO | WO2006135916 A1 | 12/2006 |
| JP | 9-288175 | A | 11/1994 | WO | WO2006135923 A2 | 12/2006 |
| JP | 6-342061 | A | 12/1994 | WO | WO2007001660 A2 | 1/2007 |
| WO | WO9205456 | A1 | 4/1992 | WO | WO2007010116 A1 | 1/2007 |
| WO | WO9427161 | A1 | 11/1994 | WO | WO2007012888 A1 | 2/2007 |
| WO | WO9428437 | A1 | 12/1994 | WO | WO2007013069 A1 | 2/2007 |
| WO | WO9503598 | A1 | 2/1995 | WO | WO2007048237 A1 | 5/2007 |
| WO | WO9521388 | A1 | 8/1995 | WO | WO2007086899 A2 | 8/2007 |
| WO | WO9605562 | A1 | 2/1996 | WO | WO2006088554 A1 | 9/2007 |
| WO | WO9635961 | A1 | 11/1996 | WO | WO2007113469 A1 | 10/2007 |
| WO | WO9726552 | A2 | 7/1997 | WO | WO2007115246 A1 | 10/2007 |
| WO | WO9747173 | A2 | 12/1997 | WO | WO2007120588 A2 | 10/2007 |
| WO | WO9804965 | A2 | 2/1998 | WO | WO2007124300 A2 | 11/2007 |
| WO | WO9805977 | A1 | 2/1998 | WO | WO2008001117 A1 | 1/2008 |
| WO | WO9814926 | A1 | 4/1998 | WO | WO2008005012 A1 | 1/2008 |
| WO | WO9822834 | A1 | 5/1998 | WO | WO2008012377 A1 | 1/2008 |
| WO | WO9822923 | A1 | 5/1998 | WO | WO2008018088 A1 | 2/2008 |
| WO | WO9835311 | A1 | 8/1998 | WO | WO2008051292 A2 | 5/2008 |
| WO | WO9843107 | A1 | 10/1998 | WO | WO2008053173 A1 | 5/2008 |
| WO | WO9849654 | A1 | 11/1998 | WO | WO2008065328 A2 | 6/2008 |
| WO | WO9908251 | A1 | 2/1999 | WO | WO2008065658 A1 | 6/2008 |

| | | |
|---|---|---|
| WO | WO2008068679 A1 | 6/2008 |
| WO | WO2008093036 A2 | 8/2008 |
| WO | WO2008116580 A1 | 10/2008 |
| WO | WO2008126126 A2 | 10/2008 |
| WO | WO2008144784 A1 | 12/2008 |
| WO | WO2008145986 A2 | 12/2008 |
| WO | WO2009001294 A2 | 12/2008 |
| WO | WO2009004381 A1 | 1/2009 |

OTHER PUBLICATIONS

Traffic Alert System Technical Design Summary, Final Report, Apr. 1994 (Baldwin et al.).
GPS Relative Accuracy for Collision Avoidance, Institute of Navigation Technical Meeting, Jan. 1997 (Rudel et al.).
Cassell, R., Smith A., Cohen, B., Yang, E., Sleep, B., A Prototype Aircraft Performance Risk Assessment Model, Final Report, Rannoch Corporation, Feb. 28, 2002.
Cassell, R., Smith A., Cohen, B., Yang, E., Sleep, B., Esche, J., Aircraft Performance Risk Assessment Model (APRAM), Rannoch Corporation, Nov. 30, 2002.
Cox, E., A., Fuzzy Logic for Business and Industry, Charles River Media, 1995, Chapter 5.
Smith, A., Cassell, R., Cohen, B., An approach to Aircraft Performance Risk Assessment Modeling, Final Report, Rannoch Corporation, Mar. 1999.
M.L. Wood and R. W. Bush, "Multilateration on Mode S and ATCRBS Signals at Atlanta's Hartsfield Airport", Lincoln Laboratory, M.I.T., Jan. 8, 1998.
AERMOD: Description of Model Formulation (Version 02222) EPA 454/R-02-002d, Oct. 21, 2002.
FAA Integrated Noise Model, www.faa.gov, current release INM 6.1 (Mar. 4, 2003).
"Flight Explorer News: Flight Explorer and Lochard Team to Provide Enhanced Flight Tracking for Cutomers Worldwide", Apr. 28, 2003, http://www.flightexplorer/com/News/press%20releases/pr042803.asp.
Source Code received by Rannoch Corp. from FAA, circa 1998.
"A Routine that converts an American Mode S address into its corresponding 'N' number string", Ken Banis, Feb. 17, 1992.
"Description of the U.S. Algorithm for Assigning Mode A Addresses", Robert D. Grappel, M.I.T. Lincoln Laboratory, Nov. 1991.
"Program to convert Mode S address to U.S. Tail Number", R.D. Grappel, M.I.T. Lincoln Laboratory, 1991.
"Program to convert U.S. aircraft tail numbers to Mode S code", R.D. Grappel, M.I.T. Lincoln Laboratory, 1991.
"ADSE and Multilateration Mode-S Data Fusion for Location and Identification on Airport Surface", J.G. Herraro J.A. Portas, F.J. Rodriguez,(IEEE 1999 Radar Conference Proceedings, pp. 315-320, Apr. 20-22, 1999).
D.C. Rickard, D.J.Sherry, S.J.Taylor, "The development of a prototype aircraft-height monitoring unit utilising an SSR-based difference in time of arrival technique", International Conference Radar 92 (Conf. Publ. No. 365), 1992, p. 250-3.
D. E. Manolakis and C. C. Lefas, "Aircraft geometric height computation using secondary surveillance radar range differences," IEE Proceedings-F, Radar, Sonar, Navigation, vol. 141, No. 2, pp. 139-148, 1994.
Request for Proposal for Acquisition of Airport Noise and Operations Monitoring System (NOMS), Indianapolis Airport Authority, Oct. 21, 2003.
Technical Specifications, for Aircraft Flight Track and Noise Management System for the Regional Airport Authority of Louisville and Jefferson County, Harris Miller, Miller & Hanson Inc. 15 New England Executive Park Burlington, MA 01803 HMMH Report No. 298950, May 16, 2003.
"Overview of the FAA ADS-B Link Decision", John Scardina, Director, Office of System Architecture and Investment Analysis, Federal Aviation Administration, Jun. 7, 2002.
"Ground-Based Transceiver (GBT) for Broadcast Services Using the Universal Access Transceiver (UAT) Data Link", FAA-E-2973, Department of Transportation, Federal Aviation Administration, Jan. 15, 2004.

"Wide Area Multilateration Report on EATMP TRS 131/04 Version 1.1", NLR-CR-2004-472, Roke Manor, Nov. 2004.
J.G. Herrero, J. A. B. Portas, F.J.J. Rodriguez, J.R.C. Corredera, ASDE and Multilateration Mode-S Data Fusion for Location and Identification on Airport Surface, (IEEE 1999 Radar Conf. Proc., pp. 315-320, Apr. 20-22, 1999).
D.C. Rickard, D.J. Sherry, S.J. Taylor, The development of a prototype aircraft-height monitoring unit utilizing an SSR-based difference in time of arrival technique, Int'l Conference Radar 92 (Conf. Publ. No. 365), 1992, p. 250-3.
D. E. Manolakis and C. C. Lefas, Aircraft geometric height computation using secondary surveillance radar range differences, IEE Proceedings-F, Radar, Sonar, Navigation, vol. 141, No. 2, pp. 139-148, 1994.
GPS Risk Assessment Study, Final Report, T.M. Corrigan et al., Johns Hopkins Univ., Applied Physics Laboratory, Jan. 1999.
Aircraft Noise Report, vol. 17, No. 1, Jan. 31, 200.
ASA MASPS—Change Issue, James Maynard, Oct. 21, 2002.
ADS-B, Automatic Dependent Surveillance—Broadcast Will ADS-B Increase Safety and Security for Aviation?, Mar. 1999, revised Jul. 2000, Darryl H. Phillips AirSport Corporation, 1100 West Cherokee Sallisaw OK 74955.
ASA MASPS—Change Issue, Greg Stayton, Aug. 1, 2002.
ASA MASPS—Change Issue, Michael Petri, Oct. 23, 2002.
ASA MASPS—Change Issue, J. Stuart Searight, Nov. 18, 2002.
ASA MASPS—Change Issue, Michael Petri, Dec. 16, 2002.
ASA MASPS—Change Issue, J. Stuart Searight, Jan. 23, 2003.
ASA MASPS—Change Issue, Tony Warren, Feb. 3, 2003.
ASA MASPS—Change Issue, Steve George, Apr. 23, 2003.
ASA MASPS—Change Issue, James Maynard, Apr. 23, 2003.
ASA MASPS—Change Issue, T.E. Foster, Jun. 11, 2003.
ASA MASPS—Change Issue, Jonathan Hammer et al., Jan. 13, 2004.
ASA MASPS—Change Issue, Tom Mosher, Jan. 13, 2004.
ASA MASPS—Change Issue, Mike Castle, Feb. 13, 2004.
ASA MASPS—Change Issue, Tony Warren, Sep. 10, 2004.
ASA MASPS—Change Issue, Mike Castle, Sep. 10, 2004.
ASA MASPS—Change Issue, Bob Smith, Sep. 1, 2004.
ASA MASPS—Change Issue, Heleberg and Kaliardos, Oct. 15, 2004.
ASA MASPS—Change Issue, Taji Shafaat, Sep. 19, 2004.
ASA MASPS—Change Issue, Stuart Searight, Nov. 3, 2004.
A Radar Substitute—David Hughes, Aviation Week & Space Technology, Mar. 7, 2005.
Statement of ACI-NA and AAAE on Airport Improvement Program Reauthorization before the Senate Aviation Subcommittee on Feb. 12, 1998. David Plavin.
Draft Proposal for the Amendment of the Sub-Cap on Off-Peak Takeoff and Landing Charges At Dublin Airport, Commission for Aviation Regulation, Nov. 23, 2003.
Aviation Infrastructure: Challenges Associated with Building and Maintaining Runways, General Accounting Office, GAO-01-90-T, Oct. 5, 2000.
Airfield Pavement: Keeping Nations Runways in Good Condition Could Require Substantially higher Spending, GAO/RCED-98-226, Jul. 1998.
Albany International Airport Pavement Management System, Albany, New York, Albany International Airport GIS-Based Pavement and Facilities Management , Fall, 2002.
Albany International Airport, New York, Uses GIS for Pavement Management, Lena Weber, Ph.D., GIS Manager, and Pat Rooney, GIS/GPS Technician, C.T. Male Associates, Summer, 2002, http://www.esri.com/news/arcnews/summer02articles/albany-airport.html.
Micropaver, Dr. M.Y. Shahin, CECER-CFF Champaign, IL May 2, 2005.
Raytheon Systems Limited Launches a Unique Solution for ADS-B,. Jan. 19, 2005, Raytheon Corp. http://www.raytheon.co.uk/highlights/ATMS.html.
Raytheon Systems Limited's ADS-B Solution Prized by International Air Traffic Authorities, Feb. 2, 2005, http://www.raytheon.co.uk/news_room/news/press_02022005.pdf.

Boeing Subsidiary and Megadata Announce Joint Marketing Agreement, Press Release, Aug. 7, 2003.
Federal Airways & Airspace, Inc. Because Accuracy Matters, Feb. 2003, Jan. 2002.
VDL4 TM Alignment With DO-242A (RTCA ADS-B MASPS) WG51/SG2, NASA, Sep. 2003.
Method to Provide System-Wide ADS-B Back-Up, Validation, and Security, A. Smith et al. 25th AIAA/IEEE Digital Avionics Systems Conference, Oct. 15, 2006.
*Positive Identification of Aircraft on Surface Movement Area—Results of FAA Trials*, 10th Annual International AeroSense Symposium, Orlando, Florida, Apr. 1996.
*Surveillance Monitoring of Parallel Precision Approaches in a Free Flight Environment*, AIAA 16th Annual Digital Avionics Systems Conference, Oct. 1997.
*Analysis of ADS-B, ASDE-3 and Multilateration Surveillance Performance*—NASA Atlanta Demonstration Presented at the AIAA 17th Annual Digital Avionics Systems Conference in Oct. 1998.
*Application of ADS-B for Airport Surface Surveillance*, Daniel Hicok, Derrick Lee IEEE AIAA 17th Annual Digital Avionics Conference, 1998.
*Atlanta Hartsfield International Airport—Results of FAA Trials to Accurately Locate/Identify Aircraft on the Airport Movement Area*, IEEE PLANS, Atlanta, GA, Apr. 1996.
*Evaluation of Airport Surface Surveillance Technologies*, IEEE Radar 96 conference, Beijing, China, Oct. 1996.
*Improved Location/Identification of Aircraft/Ground Vehicles on Airport Movement Areas—Results of FAA Trials*, Institute of Navigation in Santa Monica, CA, Jan. 1996.
*Sensis News*, http://www.sensis.com/docs/128/ © 1999-2006.
*Roke RADAR, Design and development of miniature radars and fuze sensors through to major radar programme builds*, http://www.roke.co.uk/skills/radar/, © 2006.
*Acoustic System for Aircraft Detection and Tracking, based on Passive Microphone Arrays*. Caronna, Rosello, Testa, 148th Meeting of the Acoustical Society of America, http://pcfite.ing.uniroma1.it/upload/research/4psp71107948 2021710.pdf Nov. 2004.
*Cel-Loc How We Do it, Technology Overview*, http://www.cell-loc.com/how_tech.html, Oct. 2, 2006 (original date unknown).
*Super-Radar, Done Dirt Cheap*, http://www.businessweek.com/magazine/content/03_42/b3854113.htm BusinessWeek Online, Oct. 20, 2003.
*Methods to Provide System-Wide ADS-B Back-Up, Validation and Security*, A. Smith, R. Cassell, T. Breen, R. Hulstrom, C. Evers, 25th AIAA/IEEE Digital Avionics Systems Conference, Oct. 15, 2006.
Damarel Systems International, LTD, Travel Automation Specialists, © 2004, www.dameral.com.
Airfield Pavement Computer Software, Mar. 23, 2005, Transport Canada https://www.tc.gc.ca/CivilAviation/International/Technical/Pavement/software.htm.
ARA Transportation, © 2004, http://www.araworldwide.com/expertise/industry/transportation.htm.
*The Twilight Zone, Can Wide-Area Multilateration Systems Become A Nightmare for MSSR Producers?* Aircraft Traffic Technology International 2005, Vladimir Manda, Viktor Sotona.
*Safety, Performance, and Interoperability Requirements Document for ADS-B NRA Application*, European Organisation for Civil Avaiation Equipment, Dec. 2005.
Passive Surveillance Using Multilateration, Roke Manor Research website (2003).
Letter from Marc Morgan, SIEMENS, Feb. 10, 2006.
*Required Navigation Performance (RNP) and Area Navigation (RNAV)*, Boeing, Aug. 2000.
*System-Wide ADS-B Back-Up and Validation*, A. Smith, R. Cassell, T. Breen, R. Hulstrom, C. Evers, 2006 Integrated Communications, Navigation, and Surveillance Conference.
Required Navigation Performance (RNP) Another step towards global implementation of CNS/ATM, Anita Trotter-Cox, Assessment Compliance Group, Inc. Published in Professional Pilot Magazine, Jun. 1999.
Airport Pavement Management Systems: An Appraisal of Erxisting Methodologies, Michel Gendreau and Patrrick Soriano;Pergamon Transn Res. A, vol. 32, No. 3, pp. 187-214, 1998.

*Components of a Pavement Maintenance Management System*, Mohamed Y. Shahin, U.S. Army Construction Engineering Research Laboratory, Transportaiton Research Record 791, pp. 31-39, 1980.
*Application of Markov Process to Pavement Management Systems at the Network Level*, Abbas Ahmad Butt, University of Iillinois at Urbana-Champaign (1991).
Need for Accurate Traffic Data in Pavement Management, John F. Kennedy International Airport Case Studt, Keegan, Handojo, Rada, MACTEX Engineering and Consulting, Inc, 2004 FAA Worldwide Airport Technology Transfer Conference, Apr. 2004.
PCL system with illuminator of opportunity, Huaiying tan, Min ren, Bo lie, Jinning Song, Beijing Radar Instiitute, IEEE 0-7803-9582-4/06, Apr. 2006.
High Accurate Multiple Target Detection in PCL Radar Systems; Jafargholi, A. Mousavi, M. R. Nayebi, M. M. K. N. Toosi University of Technology Department of Electrical Engineering, Tehran, Iran; Radar, 2006. CIE '06. International Conference on, Oct. 2006, Shanghai, China; ISBN: 0-7803-9583-2.
Denial of bistatic hosting by spatial-temporal waveform design; H.D. Griffiths, M.C. Wicks, D. Weinder, R. Adve, P.A. Antonik, and I. Fotinopoulos, IEE Proc. Radar Sonar Navig., vol. 152, No. 2, Apr. 2005.
Passive coherent location FPGA implementation of the cross ambiguity function; Kvasnicka, M. Hermanek, A. Kunes, M. Pelant, M. Plsek, R., Proceedings—SPIE The International Society for Optical Engineering; 2006, vol. 6159; Part 1, pp. 615918; International Society for Optical Engineering.
Passive coherent location system simulation and evaluation, Proc. SPIE, vol. 6159, 615917 (2006); DOI:10.1117/12.675065 , Apr. 26, 2006 ; Conference Title: Photonics Applications in Astronomy, Communications, Industry, and High-Energy Physics Experiments IV Libor Slezák, Michael Kvasnicka, Martin Pelant, and Jit Vavra *ERA a.s.* (Czech Republic) Radek Plsek *Technical Univ. of Pardubice* (Czech Republic).
World Airport Week, "Sharing Makes the Airport Go Round" Jan. 21, 1997, p. 1.
Huaiying Tan et al. *PCL System With Illuminator of Opportunity* Proceedings of 2006 CIE International Conference on Radar, vol. 1,0ct. 16, 2006.
Griffiths H D et al., *Denial of Bistatic Hosting By Spatial-Temporal Waveform Design* IEE Proceedings: Radar, Sonar & Navigation, Institution of Electrical Engineers, GB, vol. 152, No. 2, Apr. 8, 2005.
Jafargholi et al, *High Accurate Multiple Target Detection in PCL Radar Systems*, RADAR, 2006, CIE '06. International Conference on, IEEE, PI, Oct. 1, 2006.
Terminal, Landing Fees Increase, Dianne Gouliquer, Northern Ontario Business, Sudbury, Apr. 1, 2001, vol. 21, Issue 6, p. 24.
Conflict Detection and Resolution for Future Air Transport Management, Jimmy Krozel, Ph.D, Mark E. Peters, and George Hunter, TR 97138-01, NASA Ames Research Center, Contract NAS2-14285, Apr. 1997.
ADS-X—Next Generation Surveillance Solutions, Alex Smith, Russell Hulstron, Rannoch Corporation, ATCA Oct. 2006.
Transtech Airport Solutions, Inc., http://www.transtech-solutions.com/products/asm/airport.html, Feb. 12, 2009.
Eurocontrol Standard Document for Surveillance Interchange Part 14: Category 020, Multilateration Target Reports, SUR.ET1.ST05.2000-STD-14-02, Apr. 2008.
ATO Advanced Technology Development and Prototyping Group, http://222.faa.gov/about/office_org/headquarters_offices/ato/service_units/operations/td/.. Jan. 16, 2008.
Form B—Proposal Summary, NASA SBIR 02-1 Solicitation, http://sbir.nasa.gov/SBIR/abstracts/02/sbir/phase1/SBIR-02-1-A3.01-9714.html Sep. 5, 2002.
Form 9B—Project Summary, NASA SBIR 00-1 Soliciation http://sbir.nasa.gov/SBIR/abstracts/00/sbir/phase1/SBIR-00-1-04.01-9704.html Feb. 12, 2009.
NASA 1998 SBIR Phase 1, Proposal No. 91-1 01.02-9780B (1998) http://sbir.nasa.gov/SBIR/abstracts/98/sbir/phase1/SBIR-98-1-01.02-9780B.html.
"UK ADS-B in radar environment" (Mark Watson) http://www.eurocontrol.innt/cascade/gallery/content/public/documents/Presentations/Session%20%202%20-

%20Trials%20and%20Implementations/Watson%20-%20UK%20ADS-B%20in%20a%20radar%20environment.pdf (2006).

Ground Vehicle Operations on Airports, FAA Advisory Circular AC No. 150/5210-20 Jun. 21, 2002.

Protest Letter dated May 16, 2002 from Otto M. Wildensteiner, U.S. Department of Transportation, Washington, DC.

"Comparison of Claims in U.S. Appl. No. 09/971,672 with Prior Art", May 16, 2002, Otto M. Wildensteiner, Department of Transportation, Washington, DC.

"Minimum Aviation System Performance Standards for Automatic Dependent Surveillance Broadcast (ADS-B)", RCTA, Inc. Washington, DC, 81998.

"Runway Incursion Reduction Program Dallas-Ft. Worth Formal Evaluation Report, Final Report", Trios Associates, Inc. Dec. 21, 2000.

"TIS-B DFW Application for Airport Surface Situational Awareness", Trios Associates, Inc., Sep. 6, 2000.

"A Prototype Transceiver for Evaluating an Integrated Broadcast Data Link Architecture", Chris Moody & Warrent Wilson, RCTA SC-186, Aug. 17, 1995, RTCA Paper No. 449-95/SC186-033.

"The Universal Access Transceiver (UAT)", Warren Wilson & Chris Moody, May 10, 1995.

"Terminal Area Productivity (TAP) Study Low Visibility Landing and Surface Operations (LVLASO) Demonstration Report" Surface Surveillance Products Team (AND-410) Sep. 4, 1998.

"Phase I—Operational Evaluation Final Report Cargo Airline Association ADS-B Program, FAA SafeFlight 21 Program" Apr. 10, 2000.

"Capstone Program Plan Version 1.0", Federal Aviation Administration, Mar. 10, 1999.

"TIS-B Concept and Approach", MITRE, Chris Moody, Feb. 29, 2000.

"RTCA Special Committee 186, Working Group 5 ADS-B UAT MOPS Meeting #2, Proposed Contents and Transmission Rates for ADS-B Messages" Chris Moody, MITRE Corp., Feb. 20, 2001.

"Airborne Information Initiatives: Capitalizing on a Multi-Purpose Broadcast Communications Architecture", R.C. Strain, J.C. Moody, E.C. Hahn, B.E. Dunbar, S. Kavoussi, J.P. Mittelman, Digital Avionics Systems Conference, Oct. 1995.

"Minutes of SC-186 WG-2 (TIS-B) Meeting", Jun. 13-14, 2000.

*Primary Examiner* — Dao Phan

(74) *Attorney, Agent, or Firm* — Robert Platt Bell

(57) ABSTRACT

A system and method are disclosed to track aircraft or other vehicles using techniques including multilateration and elliptical surveillance. Unlike conventional approaches that use time difference of arrival for multilateration at a fixed set of reception points, this technique allows targets to be tracked from a number of dynamic or moving reception points. This allows for triangulation/multilateration and elliptical surveillance of targets from combinations of fixed, fixed and moving or only moving ground-based receivers, sea-based receivers, airborne receivers and space-based receivers. Additionally this technique allows for ADS-B validation through data derived from only two receivers to assess the validity and integrity of the aircraft self-reported position by comparing the time of arrival of the emitted message at the second receiver to the predicted time of message arrival at the second receiver based on the self-reported position of the aircraft and the time of arrival at the first receiver. The benefits of using less than three receivers for validation include greater validation coverage areas using a smaller set of ground stations at a lower infrastructure cost.

5 Claims, 4 Drawing Sheets

METHOD AND APPARATUS FOR ADS-B VALIDATION, ACTIVE AND PASSIVE MULTILATERATION, AND ELLIPTICAL SURVEILLANCE

CROSS-REFERENCE TO RELATED APPLICATIONS

This application is a Divisional of U.S. patent application Ser. No. 11/541,480 filed on Sep. 29, 2006, now U.S. Pat. No. 7,570,214 and incorporated herein by reference; application Ser. No. 11/541,480 is a Continuation-In-Part of U.S. patent application Ser. No. 11/492,711, filed Jul. 25, 2006, now U.S. Pat. No. 7,429,950 and incorporated herein by reference; application Ser. No. 11/541,480 is a Continuation-In-Part of U.S. patent application Ser. No. 11/429,926, filed on May 8, 2006, now U.S. Pat. No. 7,477,193 and incorporated herein by reference; application Ser. No. 11/541,480 is a Continuation-In-Part of U.S. patent application Ser. No. 11/343,079, filed on Jan. 30, 2006, now U.S. Pat. No. 7,375,683 and incorporated herein by reference; application Ser. No. 11/541,480 is also a Continuation-In-Part of U.S. patent application Ser. No. 11/342,289 filed Jan. 28, 2006 now U.S. Pat. No. 7,576,695 and incorporated herein by reference; application Ser. No. 11/541,480 is a Continuation-In-Part of U.S. patent application Ser. No. 11/209,030, filed on Aug. 22, 2005, now U.S. Pat. No. 7,248,219 and incorporated herein by reference; application Ser. No. 11/541,480 is a Continuation-In-Part of U.S. patent application Ser. No. 11/257,416, filed on Oct. 24, 2005, now U.S. Pat. No. 7,495,612 and incorporated herein by reference; application Ser. No. 11/541,480 is a Continuation-In-Part of U.S. patent application Ser. No. 11/203,823 filed Aug. 15, 2005 now U.S. Pat. No. 7,739,167 and incorporated herein by reference; application Ser. No. 11/541,480 is a Continuation-In-Part of U.S. patent application Ser. No. 11/145,170 filed on Jun. 6, 2005 now U.S. Pat. No. 7,437,250 and incorporated herein by reference; application Ser. No. 11/541,480 is a Continuation-In-Part of U.S. patent application Ser. No. 10/743,042 filed Dec. 23, 2003 now U.S. Pat. No. 7,132,982 and incorporated herein by reference; application Ser. No. 10/743,042 is a Continuation-In-Part of U.S. patent application Ser. No. 10/638,524 filed Aug. 12, 2003 now U.S. Pat. No. 6,806,829 and incorporated herein by reference; application Ser. No. 10/638,524 is a Continuation of U.S. patent application Ser. No. 09/516,215 filed Feb. 29, 2000 now U.S. Pat. No. 6,633,259 and incorporated herein by reference; application Ser. No. 09/516,215 claims is a Non Prov. of Provisional U.S. Patent Application Ser. No. 60/123,170 filed Mar. 5, 1999 and incorporated herein by reference; application Ser. No. 10/743,042 is a Continuation-In-Part of U.S. patent application Ser. No. 10/319,725 filed Dec. 16, 2002 now U.S. Pat. No. 6,812,890 and incorporated herein by reference. Application Ser. No. 10/743,042 is a Non Prov. of Provisional U.S. Patent Application Ser. No. 60/440,618 filed Jan. 17, 2003 and incorporated herein by reference.

FIELD OF THE INVENTION

The invention relates to the field of aircraft and ground vehicle tracking and surveillance. In particular, the present invention is directed toward a technique for dynamic multilateration and elliptical surveillance and also techniques for validating Automatic Dependent Surveillance (ADS) position reports using bilateration techniques.

BACKGROUND OF THE INVENTION

Global implementation of Automatic Dependent Surveillance (ADS) is underway and promises to replace conventional radar surveillance (e.g., Secondary Surveillance Radar, or SSR) within the next 10 to 20 years. Switching to ADS from radar techniques represents a fundamental shift in the techniques and philosophy of aircraft tracking.

Aircraft tracking relying on multilateration techniques are well established in the air traffic control industry with several companies supplying systems including Rannoch Corporation (www.rannoch.com), Sensis Corporation (www.sensis.com), and ERA (www.era.cz). These systems rely on the time stamping of transponder replies, either at remote sensor locations, or at a central time reference. The aircraft or vehicle location is then computed from the time difference of arrival of the transponder signal, as the transponder signal is received at multiple sensor locations. For a description of time difference of arrival multilateration, please refer to: http://en.wikipedia.org/wiki/Multilateration.

A system for elliptical surveillance uses one or more receiving elements, one or more transmitting elements, and a central workstation. The transmitting elements and receiving elements are time-synchronized to a common precision time reference. The antennas for the transmitting elements are separated in distance from the antennas from the receiving elements and are located at known positions. At a given time, one of the transmitting elements transmits an interrogation signal to one or more targets. The target(s) respond to the interrogation with a reply transmission. The reply transmission is received by one or more receiving elements and each target's ellipse of position with respect to each receiving element is calculated by the central workstation using the interrogator element time of interrogation measurement and each receiving element's time of arrival measurement for the corresponding reply transmission. The central workstation fuses the elliptical lines of position for each receiving element to compute target positions or augment passive surveillance position. At a scheduled time, the one or more transmitting elements transmit a reference signal to the receiving elements(s). The central workstation uses each of the receiving elements time stamped signals to perform integrity monitoring.

There are a variety of systems that emit pulses and other radio signals on board most aircraft including transponders, DME, TACAN, ADS-B, UAT, and various data link systems. Systems exist today, to multilaterate position using a combination of fixed ground based receiver systems, such as the PSS VERA E (http://www.era.cz/en/pss-vera-e.shtml).

Other systems that embrace the ADS-B concept of position self-reporting include Iridium, FANS (Future Air Navigation System), ACARS and CPDLC, as described below:

Iridium satellite is used for voice and data, including aircraft position self-reports. (http://www.iridium.com/corp/iri_corp-news.asp?newsid=111).

The International Civil Aviation Organization (ICAO), the International Air Transport Association (IATA), and other air traffic service providers developed the concept of FANS to transition the current air traffic control system to an advanced air traffic management system utilizing satellite based communications, navigation and surveillance for all regions of the world for the twenty-first century. For more information on FANS refer to: www.simlabs.arc.nasa.gov/library/technical_papers/aiaa96.html and http://www.icao.int/icao/en/ro/apac/2003/cnsatmgmtf/CnsAtmGM_TFReport.pdf#search='FANS %20ICAO The Aircraft Addressing and Reporting System (ACARS) is a widely used commercial service that includes aircraft self-position reports. A good description of ACARS is available from: www.ARINC.com.

Controller Pilot Data Link (CPDLC) and VDLM2 offer higher data rates for aircraft messaging that include self position reports. An excellent description and comparison of ACARS, CPDLC, and VDLM2 was presented by John Burke of ARINC at the ICNS conference in Annapolis in May, 2003. (http://spacecom.grc.nasa.gov/icnsconf/docs/2003/04_B1/B1-04-Burks.pdf#search='cpdlc').

In addition to aircraft, vehicles and ships also carry systems that provide self-reporting over a data link, for example the IBM VTS/2000 system (http://www-304.ibm.com/jct09002c/gsdod/solutiondetails.do?solution=938&expand=true&lc=en).

As the transportation industry moves toward real-time global tracking and identification of all forms of transport, there is recognition that relying on self-reporting is vulnerable to errors, or intentional spoofing, and other security issues. This is probably most acute in aviation following the events of 9/11 and the potential damage that can result from aircraft accidents. In aviation, the need for a potential back up or validation is the subject of debate at the FAA (www.faa.gov), the Next Generation of Air Traffic Systems (NGATS) and the Joint Planning and Development Office (JPDO). For more information on these organizations and aviation initiatives please visit (www.jpdo.aero).

Although, as of early 2006, there is no overall plan for a particular back-up or validation technology, the use of combinations of sensor systems has been discussed by FAA, NGATS, and JPDO. Sensor systems discussed include mixes of conventional radar systems, multilateration, passive tracking, and other techniques.

A discussion of various potential back-up methods is presented in U.S. Department of Transportation Federal Aviation Administration Safe Flight 21—Future Surveillance Broadcast Services Ground Station (BSGS) Specification Using the Universal Access Transceiver (UAT) and 1090 MHz Extended Squitter (1090ES) ADS-B Data Links, Draft, Version 2.0, 12 Dec. 2005.

There are many issues involved in selecting an appropriate back up technology including:
  Practicality
  Performance
  Independence
  Cost
  Business case The business case for ADS-B is to forgo the use of older more expensive radar technologies, in favor of a more flexible ADS self-reporting technology. It is has been difficult thus far to achieve general consensus on an optimal approach using ADS and some form of back-up. The use of encryption or secure transponders to prevent spoofing has been discussed, but there are many cost equipage issues, avionics standardization, and the ability to spoof may be reduced but will not be eliminated. (See, e.g., Viggiano, U.S. patent application Ser. No. 10/285,070, Publication No. 20040086121, entitled "Secure Automatic Dependent Surveillance," incorporated herein by reference).

Other possible methods to confirm the authenticity of ADS-B include comparison and correlation between ADS-B and TCAS, such as that described in U.S. patent application Ser. No. 10/923,433, Publication No. 20050231422, entitle "Systems and Methods for Correlation in an Air Traffic Control System of Interrogation-Based Target Positional Data and GPS-Based Intruder Positional Data," incorporated herein by reference. However, although probably a good approach for aircraft to aircraft surveillance and target verification, it is not practical for an ATC-wide application, and would still rely on some form of self-reporting. Also, TCAS is not designed to provide sufficient lateral accuracy for ATC surveillance.

SUMMARY OF THE INVENTION

Multilateration and elliptical surveillance as described above are excellent candidates for verification of ADS self-reports, providing the systems are sufficiently independent as described in Co-pending U.S. patent application Ser. No. 11/343,079 (RANN 0025), entitled "Use of Geo-Stationary Satellites to Augment Wide Area Multilateration Synchronization," incorporated herein by reference. However, there are practical limitations to the deployment of extensive fixed multilateration and elliptical systems, although novel uses have been demonstrated such as nationwide and regional use of cell towers and existing communications infrastructure (See, e.g., U.S. patent application Ser. No. 11/342,289 (RANN 0024), entitled "Multilateration Enhancements for Noise and Operations Management," and U.S. patent application Ser. No. 11/257,416, (RANN 0022), entitled "Method and Apparatus to Improve ADS-B Security" both of which are incorporated herein by reference).

In a first embodiment of the present invention, dynamic multilateration and/or elliptical approaches are used, where receiver and transmitter units would provide for a more effective, flexible surveillance system, which is not limited to regional deployment of fixed base infrastructure. For example, use of Low Earth Orbit (LEO) satellite systems to multilaterate onto aircraft generated transmissions would provide for global, independent, coverage. Although multilateration is based on time difference of arrival, if the location and time is known at each sensor, regardless of whether the sensor is fixed or moving, the target position may be calculated accurately in three dimensions.

In second embodiment of the present invention, multilateration and elliptical surveillance are possible using dynamic unsynchronized remote interrogator(s). The time of interrogation and position of interrogator are first determined by utilizing receivers on the interrogation frequency and multilateration, elliptical ranging, ADS, equations of motion, or other position determination system. This technique then enables calculation of a target's position from its response to the interrogator using the elliptical ranging, multilateration, or a combination of both.

In this second embodiment, all components (receivers, interrogators, and targets) of the multilateration and elliptical ranging system may be dynamic. For example, the use of LEO satellite systems as transmitters of interrogation signals would greatly enhance the coverage of system in areas where other aircraft or sources of interrogation were not available to illicit a response from the tracked target. Interrogators could also be aboard satellites, aircraft, ships, buoys, or any other non-stationary source.

Traditional multilateration systems as described above use at least four receivers to uniquely identify the location of the aircraft in space, or can use just three receivers when combined with altitude information provided by the aircraft's barometric altimeter and encoded within the transmitted message.

In a third embodiment of the present invention, data derived from only two receivers is used to assess the validity and integrity of the aircraft self-reported position by comparing the time of arrival of the emitted message at the second receiver to the predicted time of message arrival at the second receiver based on the self-reported position of the aircraft and the time of arrival at the first receiver.

This same concept can be alternatively understood by considering that, when the same signal is received at two separate receivers, the "time difference of arrival" principle can be used to locate the source of the signal on a hyperboloid. The present invention compares the ADS-B self-reported position to the positions on the hyperboloid and assesses the validity and integrity of the ADS-B self-reported position based on whether the self-reported position lies within an acceptable error of the hyperboloid.

This invention has a significant commercial advantage to alternate ADS-B validation approaches, which are based on multilateration, as it requires only that two receivers are able to receive data from aircraft under surveillance, rather than the three or four receivers required for traditional multilateration.

This is particularly significant when viewed in the context that ADS-B systems are generally deployed with overlapping and redundant coverage to ensure high levels of system availability. In such a system, no additional sensors may be required in order to establish an ADS-B validation mechanism.

Further, as the aircraft is tracked over time, reliability of the approach proposed in the current invention increases as it becomes increasingly improbable that the self-reported position will coincide with the dynamically changing hyperboloid calculated by the proposed invention.

BRIEF DESCRIPTION OF THE DRAWINGS AND TABLES

FIG. 1 is a block diagram of another embodiment of the present invention, using satellite-based multilateration, illustrating an aircraft emitting various signals that may include ADS-B, DME, Mode S and various other communications, navigation, and surveillance signals. Note that for the purposes of the present invention, the signals emanating from the aircraft may include any one of a number of radio or other signals, which may be detected by one or more receivers. Thus, aircraft position can be detecting using any one of a number of broadband aircraft signals—i.e., not just SSR transponders but other high frequency emitters found on aircraft (UAT, weather radar, jamming radar, TACAN, datalink, and the like). Other signals, such as cellular telephones, and other equipment onboard an aircraft may also generate signals which may be used to track location of an aircraft.

DETAILED DESCRIPTION OF THE INVENTION

Figure 1:
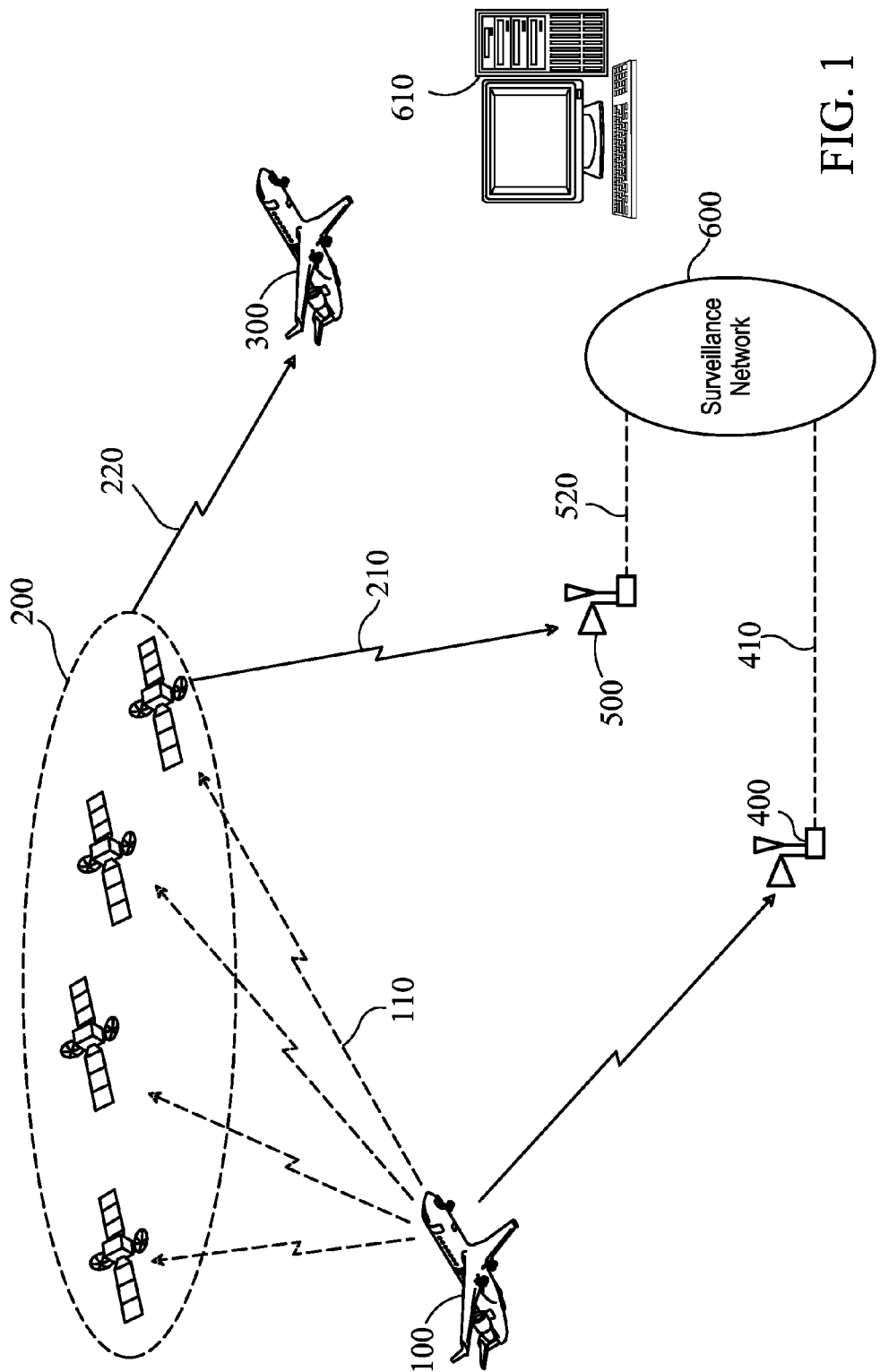

FIG. 1 is a block diagram of a first embodiment of the present invention, illustrating an aircraft 100 emitting various signals, which may include ADS-B, DME, Mode S and various other communications, navigation, and surveillance signals. Aircraft 100 may send self-reported position data to ADS-B receiver 400 which may then communicated the position data 410 to a surveillance network 600. Surveillance network 600 makes available the self-report and independently calculated report to various users 610 where they may be compared and alerts generated in the case of discrepancies. A ground-based station 610 mat then compare self-reported position data with other sources, to determine whether the self-reported position data is accurate.

Radio signals 110, output from aircraft 100, may also be received by several LEO satellites, and the time-stamped information then used to multilaterate the 3-D geometric position of the aircraft. Multilateration may be performed by the space element (e.g., on one or more satellites, which may then communicate aircraft position to other aircraft 300 or ground stations 500). Alternately, time-stamp data may be down-linked to an ATC sensor or receiver 500 which is passed onto an ATC network 520, and position data calculated at grounds station 610.

Simultaneously, the calculated position of aircraft 100 may be relayed 220 to other aircraft 300, either from satellites 200 as a form of Traffic Information Services Broadcast (TIS-B), on an appropriate data link. In one embodiment, aircraft position data may be calculated onboard satellites 200 using multilateration techniques, and then aircraft position data may then be relayed to other aircraft 300 over link 220. In this manner, each aircraft may have position and other information regarding all other similarly equipped aircraft, without having to rely upon ground installations.

Figure 2:
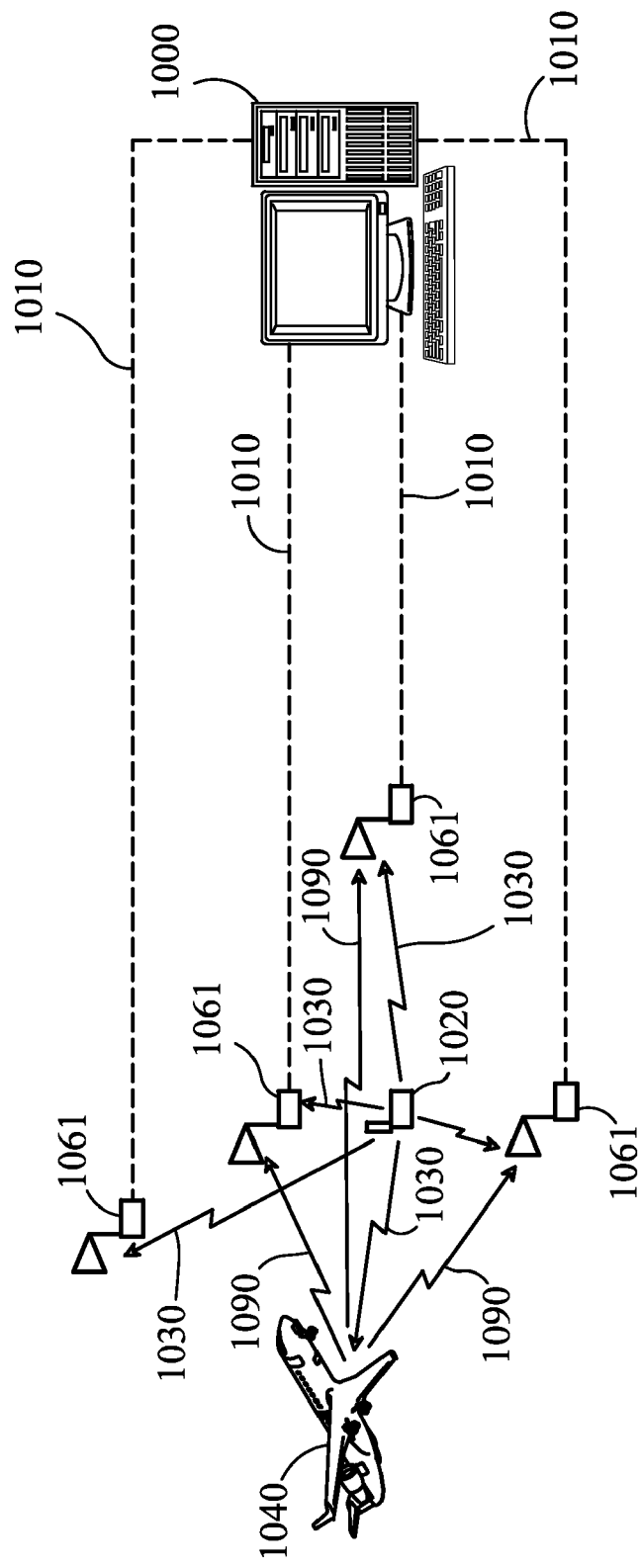
FIG. 2 is a block diagram illustrating another embodiment, illustrating dynamic interrogation.

FIG. 2 is a block diagram illustrating a second embodiment of the present invention, illustrating dynamic interrogation. Transmission of interrogation occurs (from interrogator 1020) but time of transmission and position of transmitter are not known and must be determined (1030 MHz Mlat, elliptical ranging, 1090 MHz ADS-B, ADS-C, etc.). Interrogation signal 1030 is received at receivers 1061 and received signals 1010 are sent to central server 1000. Central server may not be physically connected to interrogator 1020 in any way but may be used to compute the position of the interrogator at the time of transmission and the time of transmission.

Once position and time of transmission of interrogator 1020 has been determined by server 1000, responses from interrogated targets 1040 can be determined through receipt of their response 1090 using the central server to compute position from signals received at receivers 1061.

Interrogator 1020, targets 1040, and receivers 1061 can be moving or fixed, based on land, sea, air, or space, and can be multiples. For example, the system allows ranging at sites where system-controlled or initiated interrogation is not allowed (passive U.S. NOMS flight tracking systems) by utilizing interrogators on aircraft as sources of interrogation for ranging calculations.

The dynamic interrogation system of FIG. 2 may be combined with the use of orbiting satellites systems in FIG. 1 to interrogate targets 1040 and receive responses 1090. Such a system includes an application of ranging techniques to satellite-based interrogation and response reception. Use of dynamic interrogation sources whose time and position of transmission may or may not have to be determined first to enable multilateration and elliptical ranging. A multilateration and ranging tracking system may include combination of fixed or moving interrogators, fixed or moving receivers, and fixed or moving targets.

Figure 3:
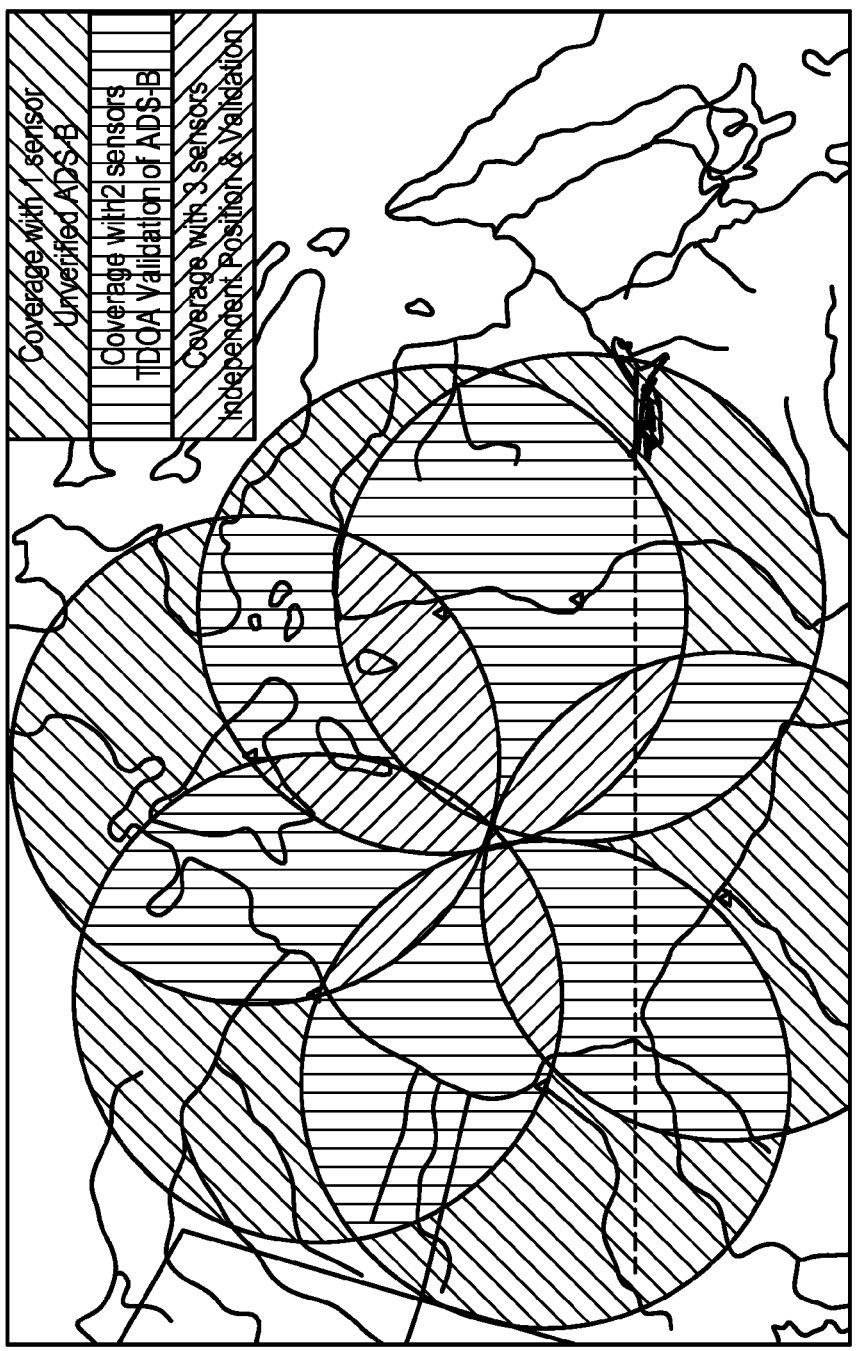
FIG. 3 is a diagram illustrating potential receiver coverage for the Hudson Bay area in Canada based on the installation of six receivers at locations around the perimeter of the bay, each with a reception range of 250 nm.

FIG. 3 is a diagram illustrating potential receiver coverage for the Hudson Bay area in Canada based on the installation of six receivers at locations around the perimeter of the bay, each with a reception range of 250 nm. The diagram is shaded to show zones with a single receiver able to receive signals, zones with two receivers in range, and zones with three or more receivers.

As the aircraft travels across this space, along the indicated dashed line, it passes through each of the following types of surveillance zone:

Where three receivers are able to receive the signal, the ADS-B self-reports can be validated by traditional multilateration systems, which can derive an independent position report for the aircraft.

Where two receivers are able to receive the signal, the ADS-B self-reports can be validated by the TDOA validation method described in the present invention.

Where only a single receiver is in range, there is no independent validation of ADS-B reports, although a surveillance system may assess the self-reported position based on tracking the aircraft from its last validated position. Based upon reported position and speed, a subsequent time-stamp can be predicted, and then compared to an actual subsequent time-stamp received at the same location.

It can be readily seen that the present invention greatly increases the total area in which ADS-B self-reports can be validated. Thus, aircraft in a larger area, can be validated for position data without the need for additional receiver installations.

Figure 4:
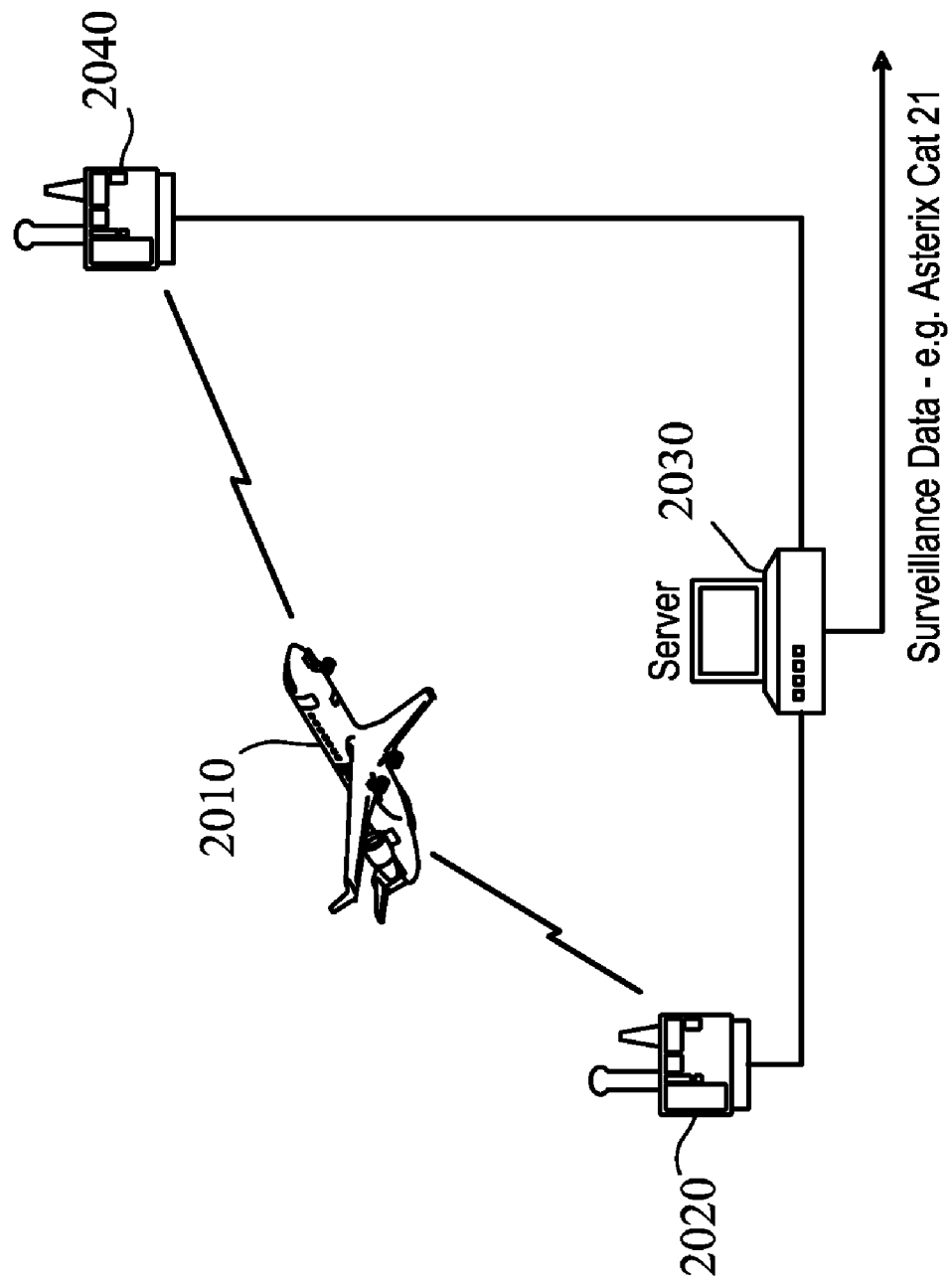
FIG. 4 is a block diagram of another embodiment of the present invention, illustrating an aircraft emitting ADS-B signals which are received, time stamped and decoded at a receiver before being passed to the central system processor.

FIG. 4 is a block diagram of this third embodiment of the present invention, illustrating an aircraft 2010 emitting ADS-B signals which are received, time stamped and decoded at receiver 2020 before being passed to the central system processor 2030. The server, knowing the location of the receiver 2020 and the reported position of the aircraft 2010, can calculate the time that the signal originated from the aircraft by calculating and deducting the time taken for the signal to travel from aircraft 2010 to receiver 2020 from the time stamp applied by receiver 2020 when it received the signal.

Knowing the (fixed) position of receiver 2040, the server can work forward and calculate the time the signal should reach receiver 2040 and compare this time to the time stamp applied by receiver 2040 when the signal actually reaches the receiver.

If the difference in these two times is outside of a predetermined acceptable level of error, the system can indicate that the data should be regarded as having lower levels of integrity by updating the data feed to the ATC display systems, or by raising an error condition.

While the preferred embodiment and various alternative embodiments of the invention have been disclosed and described in detail herein, it may be apparent to those skilled in the art that various changes in form and detail may be made therein without departing from the spirit and scope thereof.

We claim:

1. A method of tracking vehicles, comprising the step of:
   receiving, from at least one moving sensor, a radio signal,
   time-stamping the radio signal from the at least one moving sensor at least one known location, to determine a time of arrival of the radio signal from the at least one moving sensor at the at least one known location,
   calculating, from the time of arrival of the radio signal from at least one the moving sensor, a position of the at least one moving sensor,
   receiving at the at least one moving sensor, a radio signal from a vehicle,
   time-stamping the radio signal from the vehicle at the at least one moving sensor, to determine a time of arrival of the radio signal from the vehicle at the at least one moving sensor, and
   calculating, from the time of arrival of the radio signal from the vehicle at the at least one the moving sensor, a position of the vehicle.

2. The method of claim 1, wherein at least one of the at least one moving sensors comprises an orbiting satellite.

3. The method of claim 1, wherein at least one of the at least one moving sensors comprises a ground vehicle moving sensor.

4. The method of claim 1, wherein at least one of the at least one moving sensors comprises a moving ship/vessel sensor.

5. The method of claim 2, wherein the orbiting satellite broadcasts calculated vehicle position.

\* \* \* \* \*